US009964392B2

(12) United States Patent
Noda et al.

(10) Patent No.: US 9,964,392 B2
(45) Date of Patent: May 8, 2018

(54) CONTROL METHOD OF PROFILE MEASURING APPARATUS

(71) Applicant: MITUTOYO CORPORATION, Kanagawa (JP)

(72) Inventors: Takashi Noda, Shimotsuke (JP); Hiromi Deguchi, Shimotsuke (JP)

(73) Assignee: MITUTOYO CORPORATION, Kanagawa (JP)

( * ) Notice: Subject to any disclaimer, the term of this patent is extended or adjusted under 35 U.S.C. 154(b) by 122 days.

(21) Appl. No.: 15/275,985

(22) Filed: Sep. 26, 2016

(65) Prior Publication Data

US 2017/0115109 A1 Apr. 27, 2017

(30) Foreign Application Priority Data

Oct. 22, 2015 (JP) .................................. 2015-207954

(51) Int. Cl.
*G01B 5/008* (2006.01)
*G01B 5/012* (2006.01)
*G01B 5/20* (2006.01)
*G01B 21/04* (2006.01)

(52) U.S. Cl.
CPC ............... *G01B 5/012* (2013.01); *G01B 5/20* (2013.01); *G01B 21/04* (2013.01)

(58) Field of Classification Search
CPC .......... G01B 5/012; G01B 5/20; G01B 21/04
USPC .................................................. 33/502, 503
See application file for complete search history.

(56) References Cited

U.S. PATENT DOCUMENTS

| 9,298,178 | B2 | 3/2016 | Noda et al. | |
|---|---|---|---|---|
| 9,366,522 | B2 | 6/2016 | Noda et al. | |
| 2008/0236260 | A1 | 10/2008 | Noda et al. | |
| 2009/0000136 | A1* | 1/2009 | Crampton | B25J 13/088 33/503 |
| 2009/0271996 | A1* | 11/2009 | Ferrari | G01B 21/042 33/502 |
| 2011/0192042 | A1* | 8/2011 | McMurtry | G01B 21/042 33/503 |
| 2013/0310962 | A1 | 11/2013 | Noda et al. | |
| 2015/0143708 | A1* | 5/2015 | Noda | G01B 5/20 33/503 |
| 2016/0018218 | A1* | 1/2016 | Nakagawa | G01B 21/045 33/503 |

(Continued)

FOREIGN PATENT DOCUMENTS

| JP | 2008-241420 | 10/2008 |
|---|---|---|
| JP | 2013-238573 | 11/2013 |

*Primary Examiner* — G. Bradley Bennett
(74) *Attorney, Agent, or Firm* — Greenblum & Bernstein, P.L.C.

(57) ABSTRACT

During a retraction where a stylus tip separates from a work piece from a state where the stylus tip and the work piece are in contact, whether there is contact between the stylus tip and the work piece is monitored. When the contact between the stylus tip and the work piece is detected during the retraction, a probe is displaced to a position where the stylus tip does not come in contact with the work piece and a recovery process is executed. When a distance between a point on a surface of the work piece at a retraction start point and a contact point between the stylus tip and the work piece is Lm, and a value defined by (Lm−d) multiplied by a coefficient k (0<k<1) is a proper retraction amount Lr in view of a diameter d of the stylus tip.

18 Claims, 23 Drawing Sheets

(56) References Cited

U.S. PATENT DOCUMENTS

| | | | |
|---|---|---|---|
| 2016/0146589 A1* | 5/2016 | Jonas | G01B 21/045 |
| | | | 33/503 |
| 2016/0356591 A1* | 12/2016 | Noda | G01B 3/002 |
| 2017/0370688 A1* | 12/2017 | Hemmings | G01B 21/04 |
| 2017/0370690 A1* | 12/2017 | Held | G01B 5/012 |
| 2018/0017954 A1* | 1/2018 | Noda | G01B 5/008 |

* cited by examiner

CONTROL METHOD OF PROFILE MEASURING APPARATUS

CROSS-REFERENCE TO RELATED APPLICATIONS

The present application claims priority under 35 U.S.C. § 119 of Japanese Application No. 2015-207954, filed on Oct. 22, 2015, the disclosure of which is expressly incorporated by reference herein in its entirety.

BACKGROUND OF THE INVENTION

1. Field of the Invention

The present invention relates to a control method of a shape measuring apparatus.

2. Description of Related Art

Shape measuring apparatuses measuring a shape of a measured object by performing a scanning displacement of a stylus tip along a surface of the measured object are known (see, for example, Japanese Patent Laid-open Publication No. 2008-241420). The apparatus described in Japanese Patent Laid-open Publication No. 2008-241420 first converts design value based on CAD data or the like (for example, NURBS (Non-Uniform Rational B-Spline) data) into polynomial curves of a predetermined degree. In this example, a cubic function is used as the polynomial and is referred to as PCC curves (Parametric Cubic Curves). Based on the PCC curves, a route for measuring a work piece is generated. Further, a divided PCC curve is generated by dividing PCC curves. By calculating a speed curve from the divided PCC curve, a displacement speed of a probe (displacement vector) is calculated. (For example, based on a curvature and the like of each segment of the divided PCC curve, the displacement speed (displacement vector) of the probe is set.) By displacing the probe based on the calculated displacement speed, the stylus tip is displaced scanning the surface of the measured object (passive nominal scanning measurement).

Furthermore, a method of taking scanning measurement during a track correction is also known in which a depression correction vector is calculated continuously so as to keep an amount of depression of the probe constant (Japanese Patent Laid-open Publication No. 2013-238573). Nominal scanning such as in this example is referred to as an "active nominal scanning measurement."

After scanning measurements are performed at measurement positions, the probe is separated from the work piece. Then, when all measurements are completed, the probe is returned to an initial standby position. Alternatively, if a subsequent measurement position exists, the method continues and displaces the probe to the next measurement starting position. An operation separating the probe from the work piece is referred to as a retraction.

First, a retraction direction Dr is obtained from a sensor output of the probe. In other words, a normal direction of a measured surface is found based on the sensor output of the probe. The normal direction is the retraction direction Dr. A retraction length LR is given as a designated retraction length LR in advance. For example, the designated retraction length LR is given as 4 mm. When the next displacement is performed, the designated retraction length LR needs to have an amount of separation between the probe and the work piece sufficient to secure safety. On the other hand, the amount must not be too large such that the probe and the work piece come in contact during the retraction. When the designated retraction length LR is too large, the probe may contact an opposing surface of the work piece during the retraction. Whether the designated retraction length LR is appropriate may be confirmed based on design data of the work piece (such as CAD data), for example.

In a parts program of the scanning measurement, when the scanning measurement reaches an end point, "retraction" is instructed (programmed) as the next command. Therefore, when the scanning measurement reaches the end point, the retraction direction Dr is obtained from the sensor output and the retraction is performed from the measured surface with the designated retraction length LR. When the probe is separated from the measured surface with the retraction, the probe is displaced to the coordinates of the next designated destination.

The retraction is executed as mentioned above, however, an error has often occurred when the work piece and the probe come in contact during the retraction. One of the reasons is that an error exists between the design value and the actual work piece. When the work piece and the probe come in contact during the retraction, in order to avoid damage to the probe and the work piece, the retraction instantly makes an emergency stop at the time when the contact is detected and notifies a user of the occurrence of an abnormality. However, when such emergency stops occur often, measurement efficiency decreases. When an emergency stop occurs, the user needs to release the error manually and, in addition, withdraw the probe to a safety position. This requires considerable specialized skill of the user.

Furthermore, in order to prevent the same error from occurring, the retraction length needs to be reset manually. However, such operation requires even more advanced specialized skill. Such operation is very troublesome work for the user and the measurement efficiency also decreases.

SUMMARY OF THE INVENTION

The present invention provides a control method of a shape measuring apparatus to continue measurement operations with respect to a work piece having a slightly large offset from design value.

The control method of the shape measuring apparatus according to the present invention includes a probe having a stylus tip at a forefront end and a displacement mechanism displacing the probe; detects contact between the stylus tip and a surface of the work piece; and measures a shape of the work piece. When a retraction is executed separating the stylus tip from the work piece from a state in which the stylus tip and the work piece are in contact, an offset amount Ls between a final command position Pn and a final positioning point Pn' corresponding to the final command position Pn is obtained; the offset amount Ls is compared to a designated retraction length LR designated in advance; and the retraction is executed with the designated retraction length LR when Ls<β·LR is met. When Ls<β·LR is not met, the retraction is executed with an error avoidance retraction length Lr' which is defined at a value shorter than the designated retraction length LR. β is 0<β<1.

In the present invention, preferably, when the contact is detected between the probe and the work piece after the retraction is executed with the error avoidance retraction length Lr', the probe is returned to the final positioning point Pn'.

In the present invention, the probe is returned to the final positioning point Pn', and further, the retraction is preferably executed with a retraction length Lr" which is shorter than the error avoidance retraction length Lr'.

In the present invention, preferably, a direction of the retraction when executing the retraction with the error avoidance retraction length Lr' is a normal direction of a measured surface obtained based on a sensor output of the probe.

In the present invention, the error avoidance retraction length Lr' is preferably a value selected from a range between 0.1 mm and 0.5 mm. More preferably, the error avoidance retraction length Lr' is a value selected from the range between 0.1 mm and 0.3 mm.

The control method of the shape measuring apparatus according to the present invention includes the probe having the stylus tip at the forefront end and the displacement mechanism displacing the probe; detects the contact between the stylus tip and the surface of the work piece; and measures the shape of the work piece. When the retraction is executed separating the stylus tip from the work piece from the state where the stylus tip and the work piece are in contact, the control method monitors whether there is contact between the stylus tip and the work piece, and when the contact between the stylus tip and the work piece is detected during the retraction, the probe is displaced to a position where the stylus tip does not contact the work piece.

In the present invention, when the contact between the stylus tip and the work piece is detected during the retraction, coordinates of a contact point Pco between the stylus tip and the work piece are preferably sampled.

In the present invention, preferably, a distance Lm between a point Psf on the work piece surface at a retraction start point and the contact point Pco between the stylus tip and the work piece is obtained, a proper retraction amount Lr is defined based on the distance Lm and a diameter of the stylus tip, a retraction stop point Pr is a point displaced by the proper retraction amount Lr in the direction of the retraction from the retraction start point, and the stylus tip is displaced to the retraction stop point Pr.

In the present invention, preferably, the proper retraction amount Lr is defined as Lr=(Lm−d)×k where d is the diameter of the stylus tip and a prescribed coefficient k is used which is a positive integer smaller than 1 (0<k<1).

A control program of the shape measuring apparatus according to the present invention runs the control method of the shape measuring apparatus on a computer. The control program of the shape measuring apparatus may be stored on a computer-readable non-volatile storage medium and be distributed.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
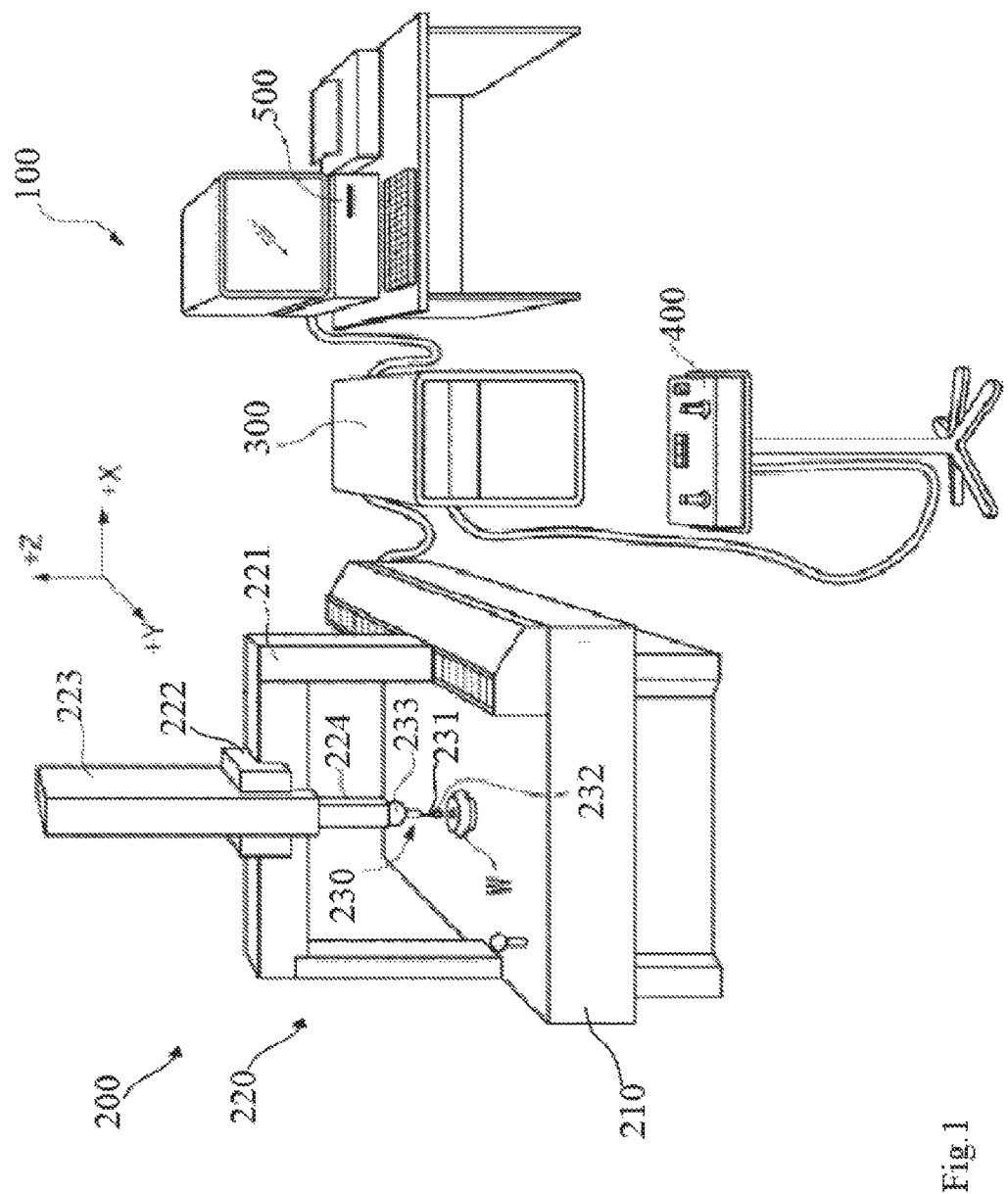
FIG. 1 illustrates an overall configuration of a shape measuring system.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

A description of embodiments of the present invention is given with reference to the drawings and to the reference numerals assigned to each component in the drawings.

First Embodiment

FIG. 1 illustrates an overall configuration of a shape measuring system 100. A basic configuration of the shape measuring system 100 is already known, but is briefly explained here. The shape measuring system 100 includes a coordinate measuring apparatus 200, a motion controller 300 controlling activation of the coordinate measuring apparatus 200, and a host computer 500 controlling the motion controller 300 and executing necessary data processing.

The coordinate measuring apparatus 200 includes a stage 210, a displacement mechanism 220, and a probe 230.

The displacement mechanism 220 includes a gate-shaped Y slider 221 provided so as to be capable of sliding above the stage 210 in a Y direction, an X slider 222 sliding along a beam in an X direction of the Y slider 221, a Z axis column 223 fixated to the X slider 222, and a Z spindle 224 rising and lowering in a Z direction inside the Z axis column 223.

The Y slider 221, X slider 222, and Z spindle 224 are each attached with a drive motor (not shown in the drawings) and an encoder (not shown in the drawings). Each drive motor is drive controlled by a drive control signal from the motion controller 300. The encoder detects a displacement amount of the Y slider 221, X slider 222, and Z spindle 224 respectively and outputs detection values to the motion controller 300. The probe 230 is attached to a bottom end of the Z spindle 224.

The probe 230 includes a stylus 231 having a stylus tip 232 on a forefront end (−Z axis direction side) and a supporter 233 supporting a base end (+Z axis direction side) of the stylus 231. The stylus tip 232 is spherical and comes in contact with a measured object W.

When an outside force is applied to the stylus 231 (in other words, when the stylus tip 232 is in direct contact with the measured object), the supporter 233 supports the stylus 231 so as to enable displacement of the stylus 231 within a fixed range in each of the X, Y, and Z axis directions. Further, the supporter 233 includes a probe sensor (not shown in the drawings) detecting a position of the stylus 231 in each axis direction. The probe sensor outputs the detection value to the motion controller 300.

(Configuration of Motion Controller 300)

Figure 2:
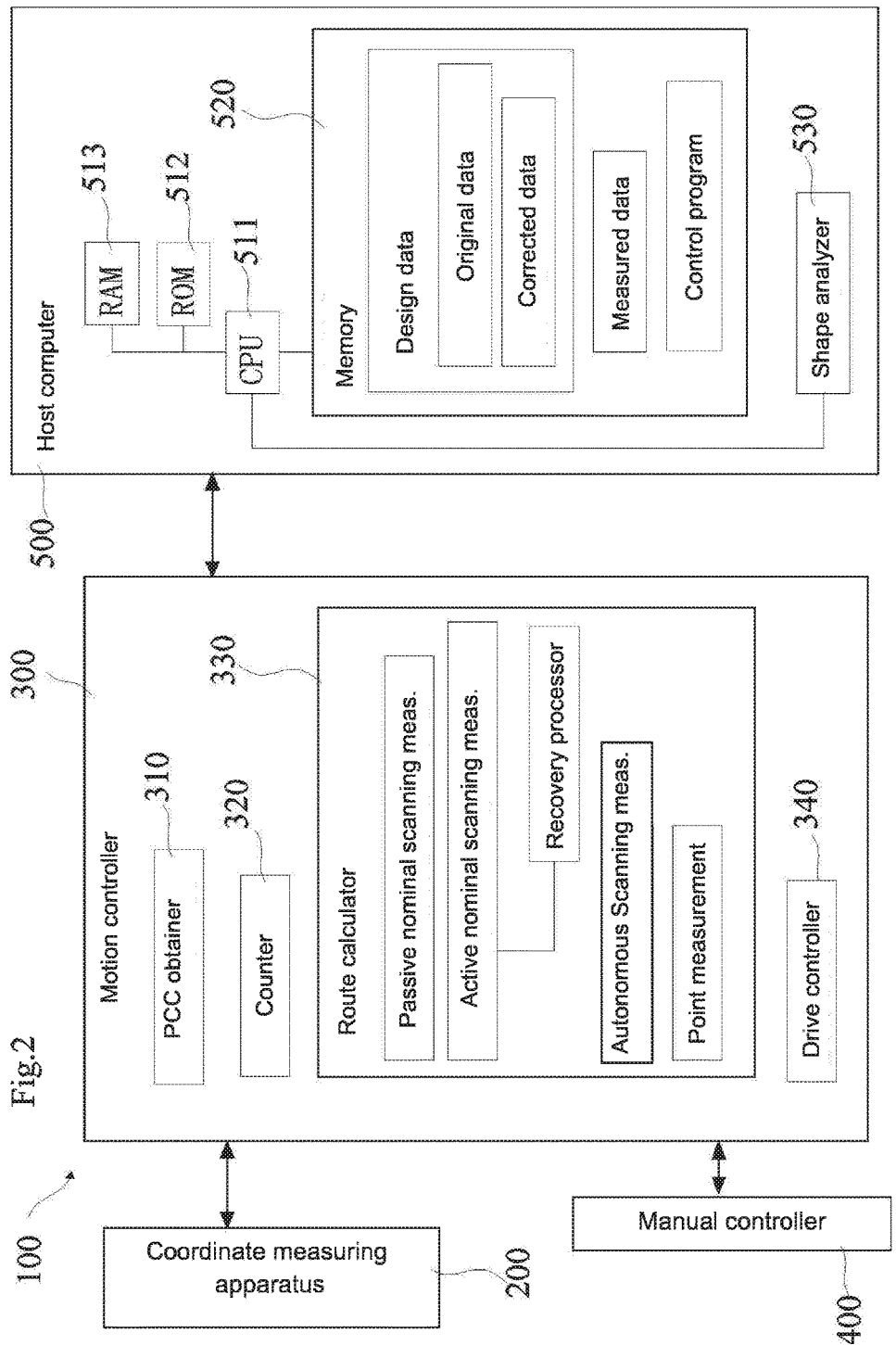
FIG. 2 is a functional block diagram illustrating a motion controller and a host computer.

FIG. 2 is a functional block diagram of the motion controller 300 and the host computer 500. The motion controller 300 includes a PCC obtainer 310, a counter 320, a route calculator 330, and a drive controller 340.

The PCC obtainer 310 obtains PCC curve data from the host computer 500. The counter 320 counts detection signals output from the encoder and measures an amount of displacement of each slider; in addition, the counter 320 counts the detection signals output from each of the probe sensors to measure the amount of displacement of the probe 230 (stylus 231). From the measured displacement of the sliders and the probe 230, a coordinate position Pp of the stylus tip 232 (hereafter, probe position Pp) is obtained. In addition, from the displacement (detection values of the probe sensor (Px, Py, and Pz)) of the stylus 231 measured by the counter 320, an amount of depression (absolute value of a vector Ep) of the stylus tip 232 is obtained.

The route calculator 330 calculates a displacement route of the probe 230 (stylus tip 232) for measuring the surface of the measured object with the probe 230 (stylus tip 232) and calculates a speed component vector (route speed vector) along the displacement route. The route calculator 330 includes various functions calculating the route corresponding to a measurement method (measurement mode). Specifically, there are four measurement methods: a passive nominal scanning measurement, an active nominal scanning measurement, an autonomous scanning measurement, and a point measurement. Each measurement method is described below as required. Further, a recovery processor is provided among the functional portions of the active nominal scanning measurement. The operations of the recovery processor are described below.

The drive controller 340 performs drive control of each slider based on the displacement vector calculated by the route calculator 330.

Further, a manual controller 400 is connected to the motion controller 300. The manual controller 400 includes a joystick and a variety of buttons, receives a manual input operation from a user, and sends an operation instruction from the user to the motion controller 300. In such a case, the motion controller 300 (drive controller 340) performs the drive control of each slider based on the operation instruction from the user.

(Configuration of Host Computer 500)

The host computer 500 is configured to include a CPU 511 (Central Processing Unit) and a memory, for example, and controls the coordinate measuring apparatus 200 via the motion controller 300. The host computer 500 further includes a memory 520 and a shape analyzer 530. The memory 520 stores design data (such as CAD data and NURBS data) related to a shape of the measured object (work piece) W, measurement data obtained from the measurements, and a measurement control program controlling an entire measurement operation.

The shape analyzer 530 performs a shape analysis by calculating surface shape data of the measured object based on measurement data output from the motion controller 300 and finding errors, distortions, and the like in the calculated surface shape of the measured object. In addition, the shape analyzer 530 also performs a computation such as conversion from the design data (CAD data, NURBS data, and the like) to the PCC curve.

By running the measurement control program with the CPU 511 (central processing unit), the measurement operation according to the present embodiment is realized.

An output device (a display or a printer) and an input device (a keyboard or a mouse) are connected to the host computer 500 as required.

(Description of Measurement Operation)

Figure 3:
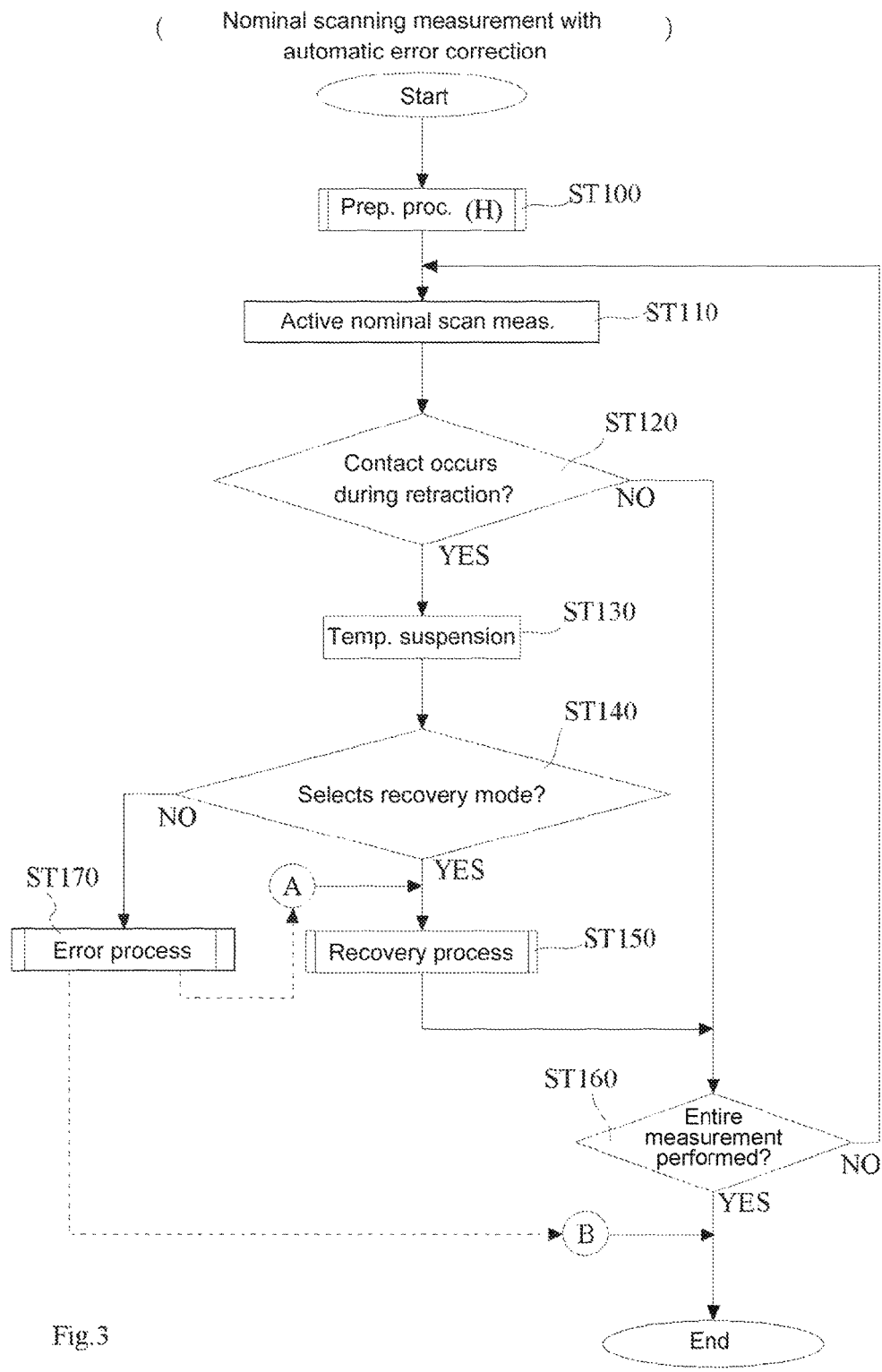
FIG. 3 is an overall flow chart describing operations of a nominal scanning measurement with error correction.

The measurement operation is described in order. The present embodiment is the nominal scanning measurement with automatic error correction and is referred to as "a nominal scanning measurement with error correction." FIG. 3 illustrates a flow according to the present embodiment and the flow is described in order. FIG. 3 is an overall flow chart describing operations of the nominal scanning measurement with error correction.

Figure 4:
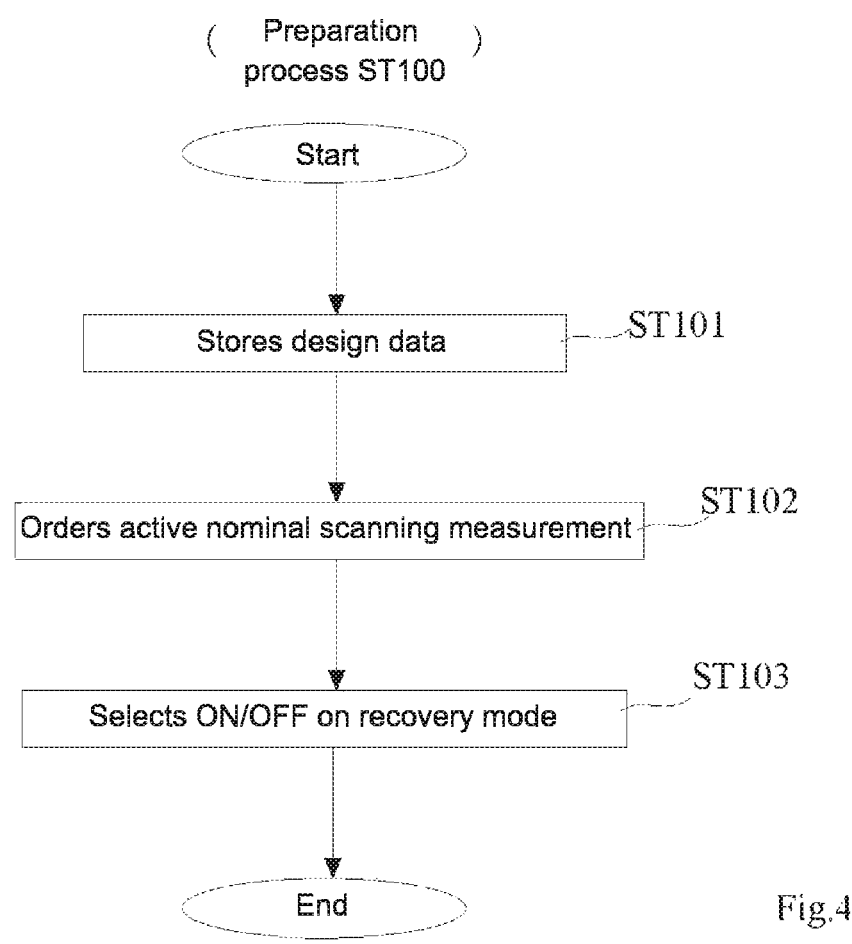
FIG. 4 is a flow chart illustrating a procedure of a preparation process (ST100)

First, necessary preparation for scanning measurement is performed (preparation process ST100). The preparation process (ST100) is executed by the host computer 500. ("H" inside a box of the flow chart means that the process is executed by the host computer 500. A box without "H" is executed by the motion controller 300.) FIG. 4 illustrates the preparation process (ST100) in order. The user places the measured object (work piece) on the stage 210 and stores the design data of the work piece in the memory 520. The design data of the work piece is stored in the memory 520 as "original data" (ST101).

Next, the host computer 500 issues a command for nominal scanning measurement to the motion controller 300 based on the selection from the user (ST102). In this example, the active nominal scanning measurement is ordered.

Figure 5:
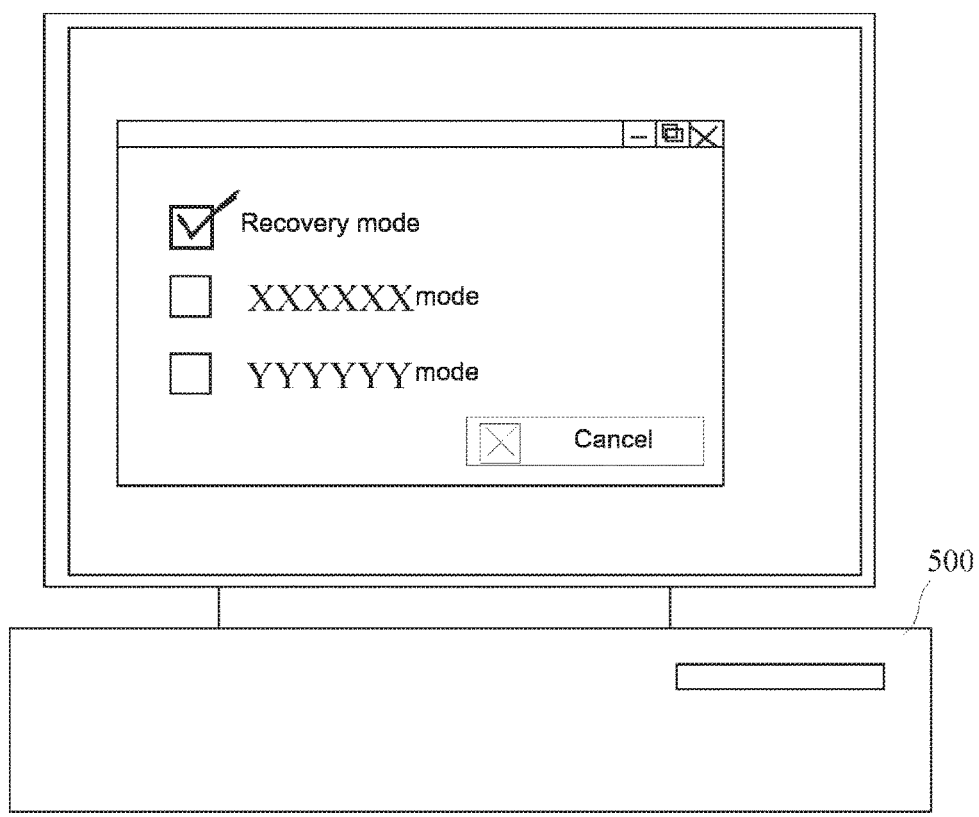
FIG. 5 illustrates an exemplary selection screen in which a user selects ON/OFF on a recovery mode.

When the user selects the active nominal scanning measurement, the host computer 500 requires the user to select a mode (ST103). For example, a selection screen shown in FIG. 5 is displayed on the display and asks the user to select ON/OFF on a recovery mode. The decision of the selection on the recovery mode is sent to the motion controller 300 from the host computer 500. When the recovery mode is ON, the recovery process is executed as required (ST150). The recovery process (ST150) is described below. This concludes the preparation process (ST100).

By undergoing the preparation process (ST100), the motion controller 300 measures the work piece with the active nominal scanning measurement (ST110). The active nominal scanning measurement is well known and is disclosed in detail in Japanese Patent Laid-open Publication No. 2013-238573, for example.

Though a detailed description is omitted, a brief explanation of the active nominal scanning measurement is provided. The original data is the CAD data (such as NURBS data), for example. First of all, the CAD data (such as NURBS data) is converted to point group data. The data for each point is data combining the coordinate values (x, y, z) and the normal directions (P, Q, R). (In other words, (x, y, z, P, Q, R)). The coordinate value at each point is offset by a predetermined amount in the normal direction. (Specifically, the predetermined amount is defined as stylus tip radius r—a reference amount of depression E0.) The point group data obtained in this way is converted into a PCC curve group. Further, the PCC curve group is divided into segments (divided PCC curves) at a plurality of points. Processes up to this point are performed by computation inside the host computer 500. The PCC curves generated in this way are sent to the motion controller 300 and are stored in the PCC obtainer 310 temporarily.

The route calculator 330 generates the route for measuring the work piece based on the PCC curves obtained. The route calculator 330 generates the route corresponding to the measurement method. In this example, the active nominal scanning measurement is selected and therefore, the route for the active nominal scanning measurement is generated. (In this regard, the generated route is the same in the active nominal scanning measurement and the passive nominal scanning measurement.) In addition, the route calculator 330 sets the displacement speed of the probe 230 in accordance with a curvature and the like of the divided PCC curve and determines the displacement direction and the displacement speed (speed vector) for each point on the PCC curve. Nominal scanning measurement is achieved when the probe 230 is displaced according to the displacement vector realizes.

Furthermore, when performing the active nominal scanning measurement, the vector in the normal direction (depression correction vector) is generated such that the amount of depression Ep is constant, and in addition, a vector in a course correction direction (course correction vector) is generated, the course correction vector correcting offset between a center coordinate of the current stylus tip 232 and the route. Then, a combined speed vector is generated combining the speed vector, the depression correction vector, and the course correction vector. The drive controller 340 provides a drive signal to the coordinate measuring apparatus 200 according to the combined speed vector. Accordingly, the coordinate measuring apparatus 200 measures the work piece with the active nominal scanning measurement.

The coordinate measuring apparatus 200 is driven by the drive signal from the motion controller 300, and the active nominal scanning measurement is executed (ST110). The detection values (probe sensor detection value and encoder detection value) from the coordinate measuring apparatus 200 are fed back to the host computer 500 via the motion controller 300. The data obtained by the measurement is stored in the memory 520.

While executing the active nominal scanning measurement (ST110), the motion controller 300 monitors whether there is an unexpected contact between the probe 230 (stylus tip 232) and the work piece during the retraction operation (ST120). If there is no contact (ST120: NO), ST110 and ST120 are run in a loop until all measurements of the measured object (for example, an entire work piece) are finished, and the loop ends when all measurements of the measured object (such as the entire work piece) are measured (ST160: YES).

Figure 6:
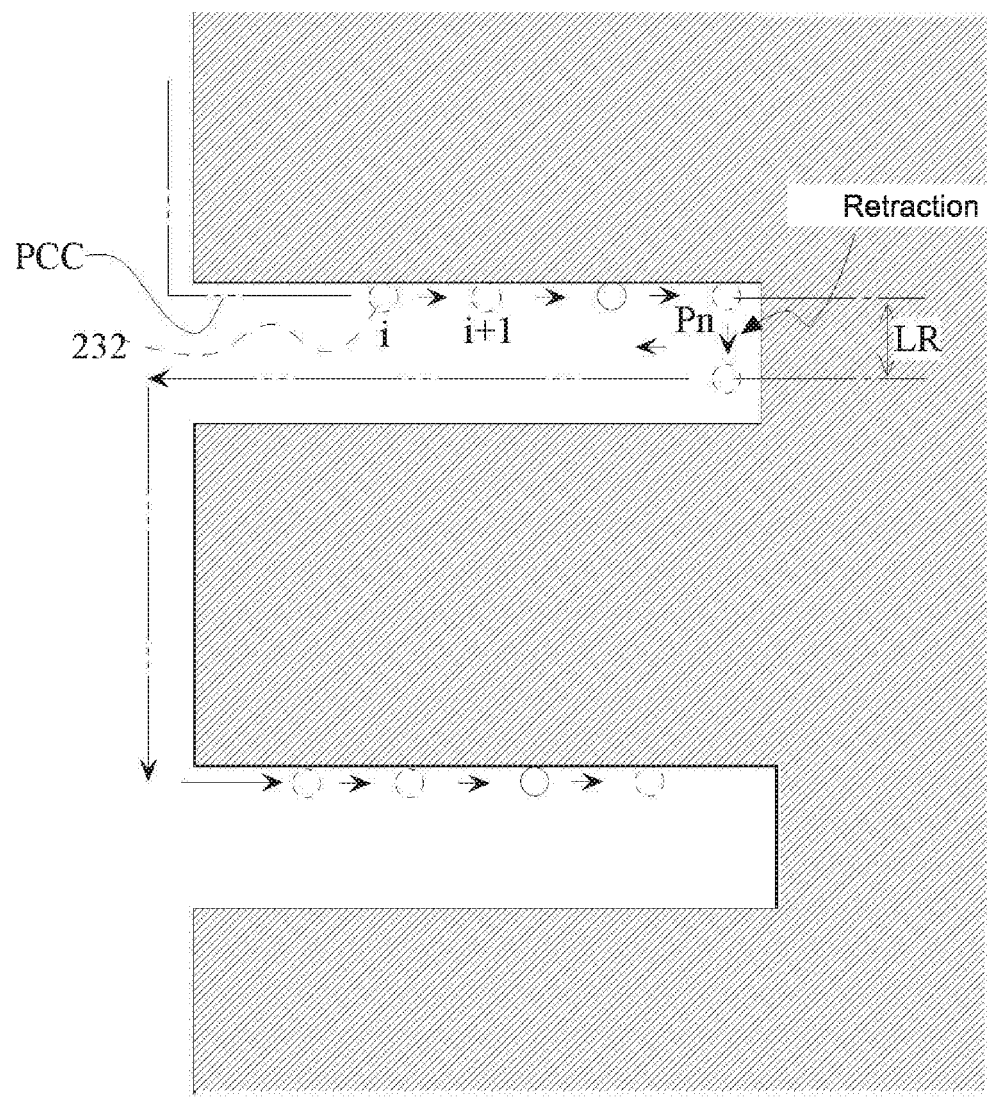
FIG. 6 illustrates how a work piece having a fine hole is measured with an active nominal scanning measurement.

The exemplary operation during the active nominal scanning measurement is shown. FIG. 6 illustrates a state where the work piece W having a fine hole is measured with the active nominal scanning measurement. In FIG. 6, the work piece W is processed as in the design data. The route (PCC curve) of the nominal scanning measurement is defined, based on the design data, by adding the predetermined offset to the design data. When the (active) nominal scanning measurement is performed, the coordinate measuring apparatus 200 is drive controlled such that the stylus tip 232 displaces from an interpolated point (i) to the next interpolated point (i+1) on the route (PCC curve).

The measurement of the fine hole portion ends at the point Pn in FIG. 6 and the probe 230 is displaced to the next position to be measured (for example, a neighboring fine hole portion). At this point, the retraction is performed at the point Pn, where the probe 230 separates from the work piece. In FIG. 6, the work piece is processed as in the design data. Therefore, the probe 230 (stylus tip 232) has no risk of contacting the work piece during the retraction. In this example, LR in FIG. 6 is the retraction length when the retraction is performed with the retraction route based on the design value. The retraction length is referred to as a command retraction length LR.

Figure 7:
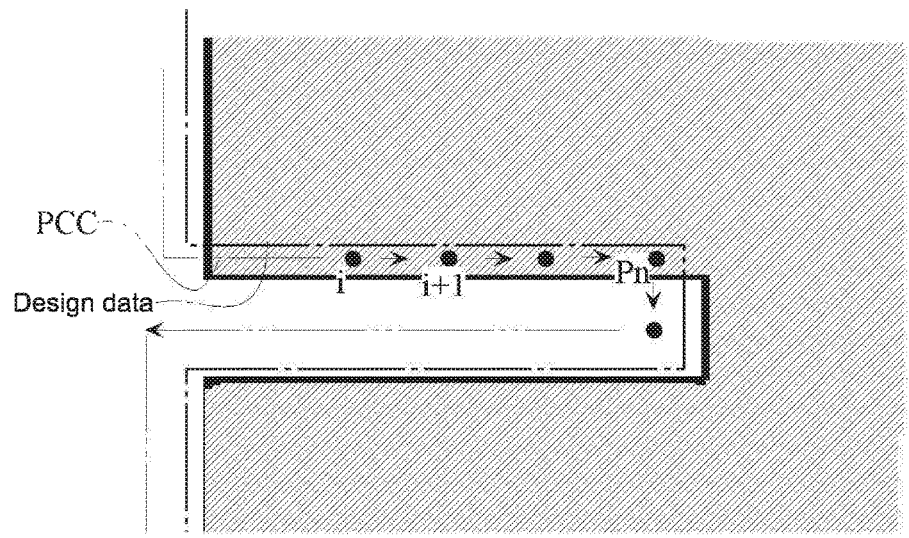
FIG. 7 illustrates an exemplary case where an offset is generated between an actual work piece and design data.

Next, in FIG. 7, though the work piece is processed as in the design data, an exemplary case is illustrated where slight processing errors occurred. Depending on a level of accuracy of machine tools, the actual work piece produced may be slightly shifted from the design data. Even in such a case, the route for the (active) nominal scanning measurement is generated based on the design data.

Figure 8:
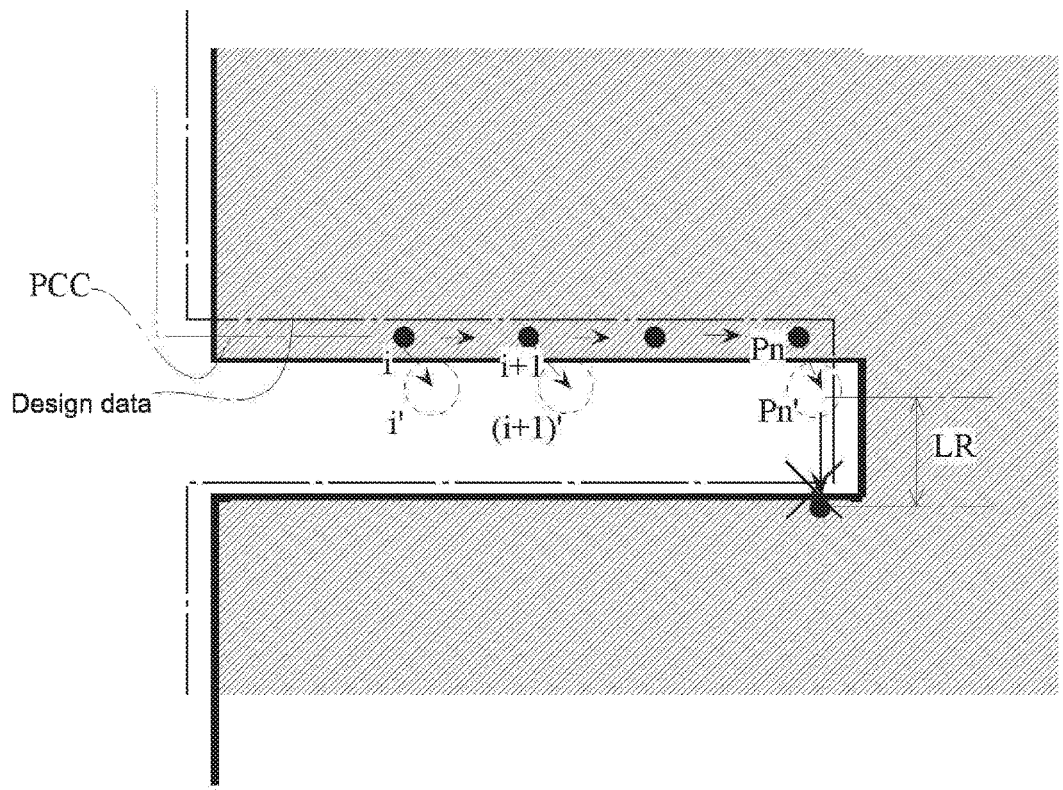
FIG. 8 illustrates how the work piece in FIG. 7 is measured with the active nominal scanning measurement.

FIG. 8 illustrates how the work piece in FIG. 7 is measured with the active nominal scanning measurement. In the active nominal scanning measurement, using course correction to keep the amount of depression Ep constant, the stylus tip 232 performs the scanning displacement along the surface of the work piece. Therefore, even though the offset exists between the design data and the actual work piece as shown in FIG. 7 (FIG. 8), the probe 230 continues the scanning measurement.

As a result of continuing the active nominal scanning measurement, the probe 230 (stylus tip 232) reaches the point Pn'. The point Pn' corresponds to a point where the point Pn is course-corrected to keep the amount of depression Ep constant. The retraction is performed when the point Pn' is reached. Then, when the retraction is performed with the designated retraction length LR, the probe 230 (stylus tip 232) and the work piece may come in contact (ST120: YES).

Further, in a case where the passive nominal scanning measurement (not the active nominal scanning measurement) is executed, when the offset exists between the design data and the actual work piece (for example, an offset range of several tenths of a millimeter), errors occur in which the probe 230 (stylus tip 232) is separated from the work piece or the probe 230 is depressed too much. When such errors occur, the nominal scanning measurement itself is inoperable and the coordinate measuring apparatus 200 suspends operations. In other words, when the offset exists between the design data and the work piece as shown in FIG. 7 (FIG. 8), the probe 230 (stylus tip 232) does not enter deep in the fine hole with the passive nominal scanning measurement.

Even in the active nominal scanning measurement, the size of the acceptable offset is often defined in advance. The offset between the route of the nominal scanning measurement and the actual position of the stylus tip 232 is referred to as a course error ΔL. An allowable value of the course error ΔL is defined at about 1.5 mm, for example. When the course error ΔL is above 1.5 mm, even the active nominal scanning measurement is incapable of the course correction and the active nominal scanning measurement itself results in an error. In such a case, the coordinate measuring apparatus 200 suspends operations due to the error.

In contrast, when the course error ΔL is 1.5 mm or less, the active nominal scanning measurement continues. Even with the work piece largely shifted from the design data, the active nominal scanning measurement allows the scanning measurement to continue without errors. This is convenient for the user, but may lead to frequent instances of contact during the retraction, which only rarely happened in the passive nominal scanning measurement. In addition, when the probe is suspended inside the fine hole, a manual recovery may be accompanied by slight difficulties. There may be a case where an interior of the hole cannot be viewed directly.

Operations are described when contact occurs during the retraction (ST120: YES). The motion controller 300 suspends the displacement of the probe 230 immediately when contact between the probe 230 (stylus tip 232) and the work piece is detected during the retraction (ST130). In other words, when the depression of the probe 230 is detected during the retraction, the coordinate measuring apparatus 200 temporarily suspends the operation.

Then, verification is performed as to whether the recovery mode is selected (ST140). When the recovery mode is selected (ST140: YES), the process proceeds to the recovery process (ST150).

Figure 9:
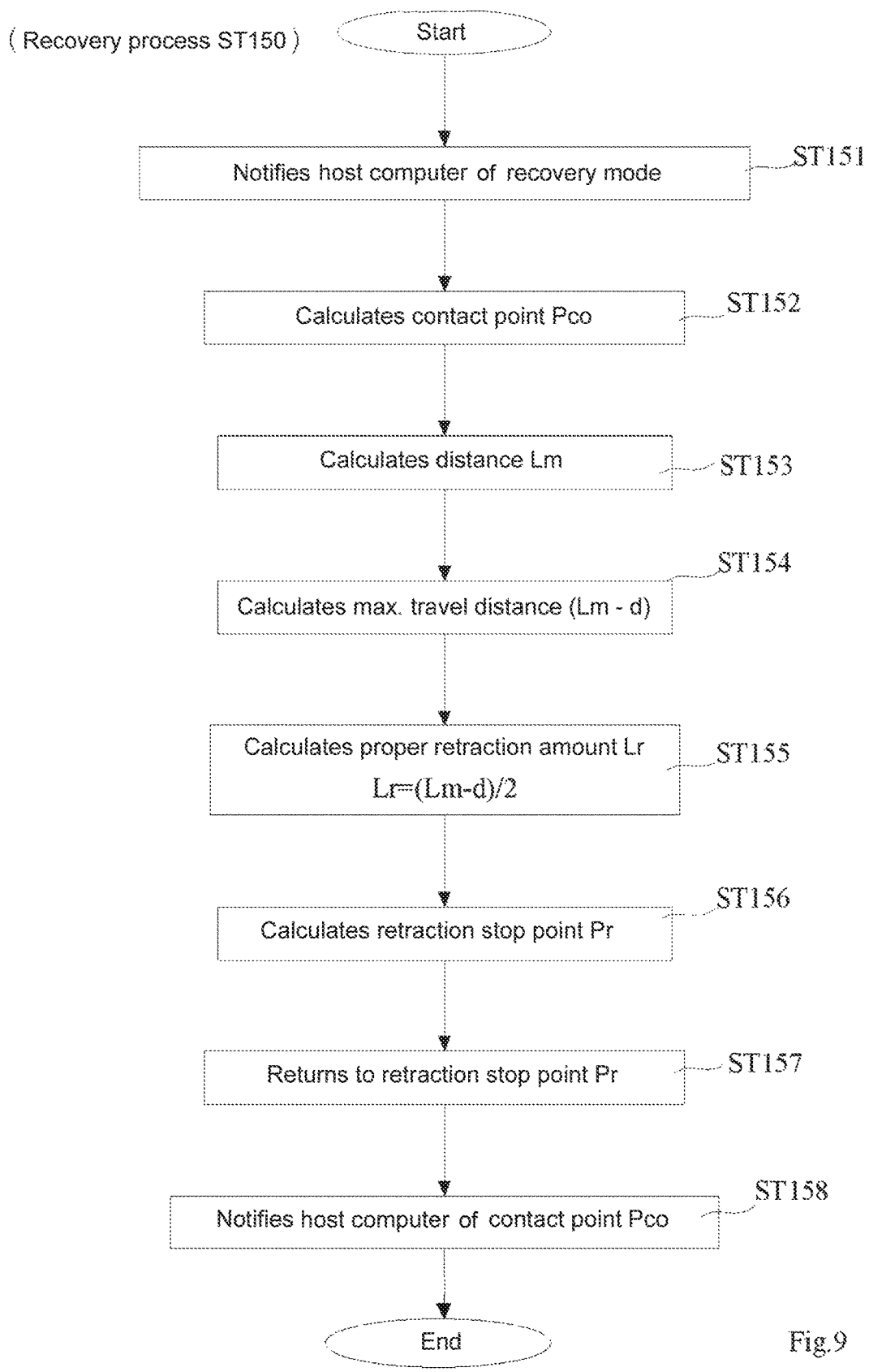
FIG. 9 is a flow chart illustrating an operation procedure of a recovery process (ST150)

The recovery process (ST150) is described in detail. FIG. 9 is a flow chart illustrating an operation procedure of the recovery process (ST150). In the recovery process, the motion controller 300 first notifies the host computer 500 of the change to the recovery process (ST151). The host computer 500 notifies the user of the change to the recovery process (for example, displayed on the display) and in addition, places measurement operations such as storing measurement data in a standby state temporarily.

Figure 10:
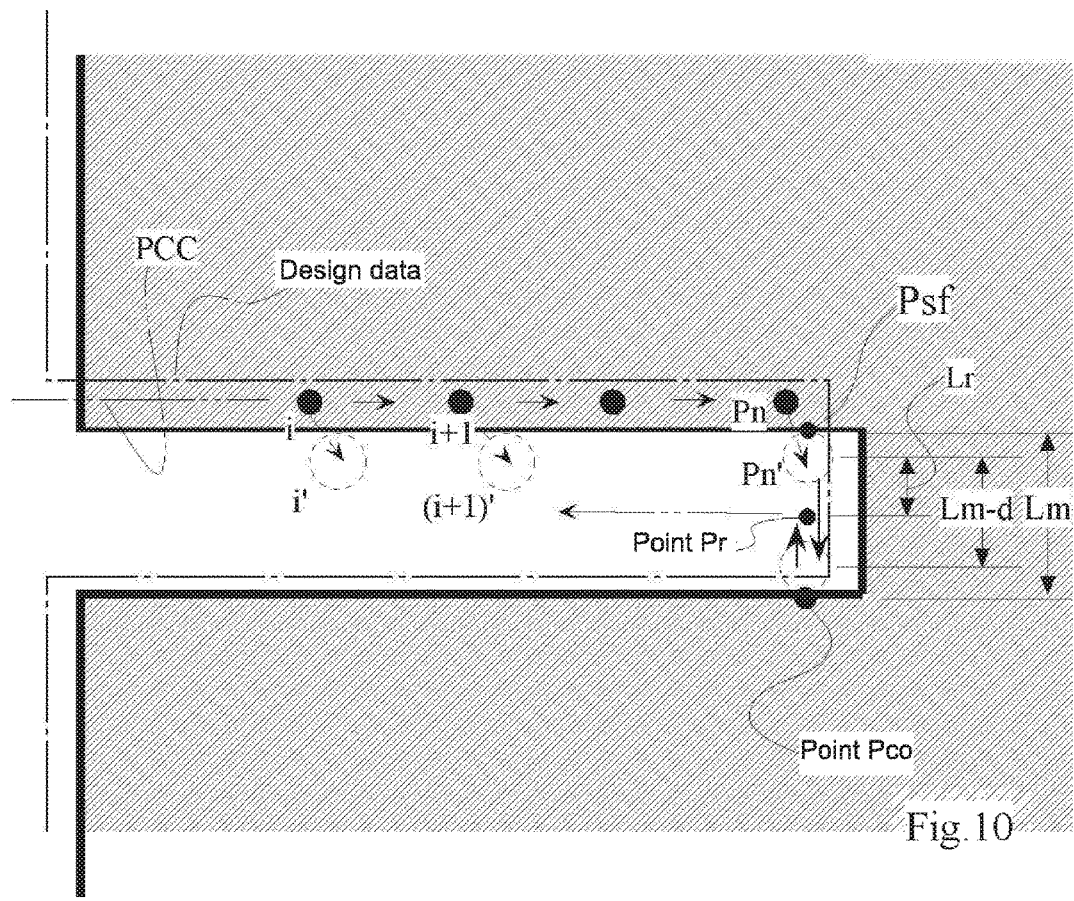
FIG. 10 is an explanatory diagram illustrating the recovery process.

Next, the motion controller 300 calculates a contact position (ST152). In other words, the position of each slider is found from the detection signal output from the encoder, and in addition, the amount of displacement of the probe 230 (stylus 231) is calculated by counting the detection signal output from the probe sensor. Since the center coordinate Pp (probe position Pp) of the stylus tip 232 can be obtained in this way, by then adding the offset of the radius of the stylus tip 232 in the direction of the depression, a contact point Pco between the work piece and the stylus tip 232 is calculated (see FIG. 10).

This is the same as the so-called point measurement and by sampling the coordinates when a predetermined amount of depression is reached (0.3 mm for example), accurate coordinates of the contact point Pco are obtained.

Next, a point (Psf) on the surface of the work piece in a final positioning position (Pn') corresponding to a final command position (Pn) is found and a distance Lm between Psf and Pco is calculated (ST153). The distance Lm corresponds to a width of the fine hole, for example. Taking the diameter d of the stylus tip 232 into consideration, a maximum travel distance from a retraction start point (Pn') to the contact point (Pco) with the work piece is defined as Lm–d (d is the probe diameter) (ST154). In other words, the retraction can be performed without contacting the work piece if the retraction is less than the maximum travel distance (Lm–d).

Given this, an amount of proper retraction Lr is calculated next (ST155). The amount of proper retraction Lr is calculated by multiplying a coefficient k of less than 1 (0<k<1) by the maximum travel distance Lm–d. Herein, as an example, k=0.5. Within the range of the amount of proper retraction Lr obtained in this way, the retraction can be performed without contact between the stylus tip 232 and the work piece.

Although this is a fine point, since this is also important, some additional explanation is provided. When the amount of the predetermined depression during the scanning measurement is defined at 0.3 mm, the probe 230 is pressed 0.3 mm toward the work piece at the position of the point Pn'. However, the coordinate value (Pn') of the stylus tip center is obtained based on the sum of the output from each encoder and output from the probe sensor of the coordinate measuring apparatus 200, and has the same coordinate value while the stylus tip 232 is in contact with the work piece. Since the probe sensor outputs a depression amount in the amount the coordinate measuring apparatus 200 depresses the probe 230 toward the work piece, it comes out even.

The operation of backing the probe 230 up from the state where the probe 230 is pressed toward the work piece is considered in detail. Even though the coordinate measuring apparatus 200 starts backing the probe 230 up, the stylus tip 232 does not displace (the center of the stylus tip is also immobile) while the depression (0.3 mm) is restored. Since the stylus tip 232 does not displace, an unintentional collision between the stylus tip 232 and the work piece cannot possibly occur during this time. When the depression of the probe 230 is zero, the stylus tip 232 starts separating from the work piece.

In the present specification, the retraction operation is considered to start at the moment when the stylus tip 232 is separated from the work piece (amount of depression is zero), and the retraction operation is referred to as the operation occurring from the moment when the stylus tip 232 is separated from the work piece (amount of depression is zero) till the stylus tip 232 stops.

Based on the amount of proper retraction Lr, a retraction stop point Pr is calculated (ST156). The retraction stop point Pr is a position where the amount of proper retraction Lr is added in the direction of retraction from the retraction start point (Pn').

When the retraction stop point Pr is obtained, the motion controller 300 displaces the probe 230 (stylus tip 232) to the retraction stop point Pr (ST157). Accordingly, the contact state between the probe 230 (stylus tip 232) and the work piece is resolved, resulting in a successful recovery.

The motion controller 300 notifies the host computer 500 of the coordinate value of the contact point Pco previously calculated (ST158). This concludes the recovery process (ST150).

The host computer 500 releases the standby state of the recovery when the notification of the contact point Pco is received. The host computer 500 stores the notified contact point Pco in the memory 520, and then performs the correction of the design data based on information of the contact point Pco.

For example, a width and a center axis of the fine hole are identified from the distance Lm between the point on the surface of the work piece (Psf) at the final positioning position (Pn') and the contact point Pco. Based on the information, the position of the fine hole is corrected by the shape analyzer. When the design data corrected in this way is returned to the motion controller 300 (PCC obtainer 310), a displacement route which does not contact the work piece is obtained. Therefore, the proper route after the process (of measurement after the retraction stop point Pr) can be generated and the subsequent scanning measurement can be continued. In addition, if a work piece (product) is processed using the same machine tool based on the same design data, measurement can be expected to proceed without error with the nominal scanning measurement beginning with the second work piece.

Further comments are added here for clarification. Correcting the design data does not imply a desire to form a work piece which is shifted from the original design data. It goes without saying that the main focus is to generate a suitable route when measuring the actual formed work piece using the nominal scanning measurement.

After the successful recovery, the motion controller 300 continues the active nominal scanning measurement (ST110) and ends when all measurements of the measured object (for example, the entire work piece) are performed (ST160: YES).

Further information follows for a case where the user does not select the recovery mode in the process of selecting the recovery mode (ST103) during the preparation process (ST100). During the retraction in the state where the recovery mode is not selected, the probe 230 (stylus tip 232) and the work piece may come in contact. In such a case, the process may end with an error or the user may be given another chance to re-select.

Figure 11:
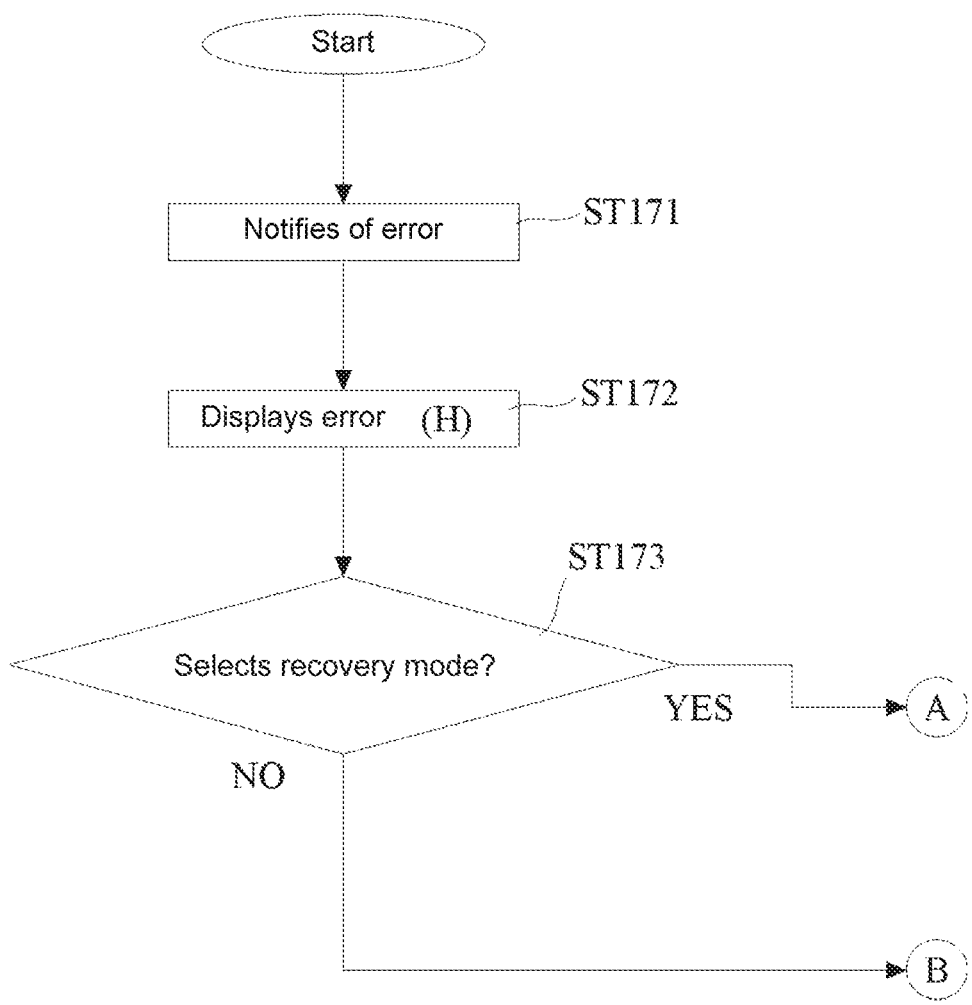
FIG. 11 is a flow chart illustrating a procedure of an error process (ST170)

In this scenario, the probe 230 (stylus tip 232) and the work piece come in contact during the retraction (ST120: YES), but the recovery mode is not selected (ST140: NO). In this case, the following error process (ST170) is executed. FIG. 11 illustrates the procedure of the error process (ST170). The motion controller 300 notifies the host computer 500 of the error (ST171). In other words, in a state where the recovery mode is not selected, the host computer 500 is notified of the contact between the probe 230 (stylus tip 232) and the work piece. When the error notification is received, the host computer 500 displays an error message (for example, displayed on the display). At the same time, the host computer 500 displays the selection screen shown in FIG. 5 on the display and allows the user to select ON/OFF on the recovery mode.

When the user selects "ON" on the recovery mode (ST 173: YES), it proceeds to the recovery process (ST150). In this case, the recovery process (FIG. 9) described above is executed.

When the user does not select the recovery mode (for example, cancel without selecting the recovery mode), the process ends at that point. (Thereafter, the manual operation is performed at the user's discretion.)

The following beneficial effects are achieved with the above-noted configuration—"nominal scanning measurement with error correction."

(1) Since the active nominal scanning measurement can perform the nominal scanning measurement of a work piece with a slightly large offset from the design data, there is a great advantage in measurement efficiency. For example, the passive nominal scanning measurement cannot be applied to a work piece with a large offset from the design data. In addition, the autonomous scanning measurement takes time. However, when the active nominal scanning measurement is performed on the work piece with the slightly large offset from the design data, unexpected contact may occur during the retraction. When the process ends with an error for every contact during the retraction, the beneficial effects of the active nominal scanning measurement having favorable measurement efficiency are reduced considerably. In this regard, the present embodiment includes the recovery mode automatically recovering from the contact during the retraction, and is capable of automatic recovery with the recovery process. This further improves the convenience of the active nominal scanning measurement and leads to various remarkable effects including high-speed measurement, simplification of the measurement task, increased efficiency, and the like.

(2) In the recovery process, the coordinates of the contact point Pco are found (ST152) and the position of the contact point Pco is transmitted to and stored in the host computer 500 (ST158). Based on the information of the contact point Pco stored in the host computer 500, the subsequent measurement can be continued and efficient measurement can be performed beginning with the second measurement. If the contact state (error state) is simply eliminated, recovery from the error is possible by simply retracting a little in a reverse direction at the moment the contact (collision) is detected. (Another approach is to have the user displace the probe 230 to the next measurement position by manual operation thereafter.) This may be somewhat facilitated by eliminating the error state automatically, however, if the user needs to operate manually every time, this is still burdensome. In this regard, the present embodiment finds the coordinates of the contact point Pco accurately (ST152) and stores the same (ST158). Accordingly, manual operation by the user is largely unnecessary and the measurement operation is drastically simplified.

First Modification Example

In the embodiment above, $Lr=(Lm-d)\times k$ is offered as an exemplary retraction amount. The retraction should be performed within a range where the probe (stylus tip) does not collide with the work piece, and therefore methods of setting the amount of retraction can be considered in addition to this. For example, (1) $Lr=Lm\times k'$, where k' may be defined to be a small value about 0.1 or 0.2. The amount of proper retraction can be set without subtracting the diameter d of the stylus tip from Lm, if k' is small. Alternatively, (2) $Lr=Lm-d-\alpha$ (0.5 mm<$\alpha$<2.0 mm) may also be considered. When the probe is separated from the work piece by a distance $\alpha$, a safe retraction is considered possible. In addition, when the retraction stop point Pr is found with Lr (=$Lm-d-\alpha$), in a case where the retraction stop point Pr is inside the work piece the process may end with error or a may be reset to a smaller value.

Second Embodiment

A description of a second embodiment of the present invention follows. In the first embodiment mentioned above, the retraction operation is performed as designated and if the probe and the work piece come in contact during the retraction, a restoring process (recovery process) is performed. In contrast, in the second embodiment the probe and the work piece do not come in contact (collide) during the retraction as much as possible. The second embodiment is a nominal scanning measurement with an error avoidance function and is referred to as a "nominal scanning measurement with error avoidance function." Hereafter, step by step descriptions are provided.

Figure 12:
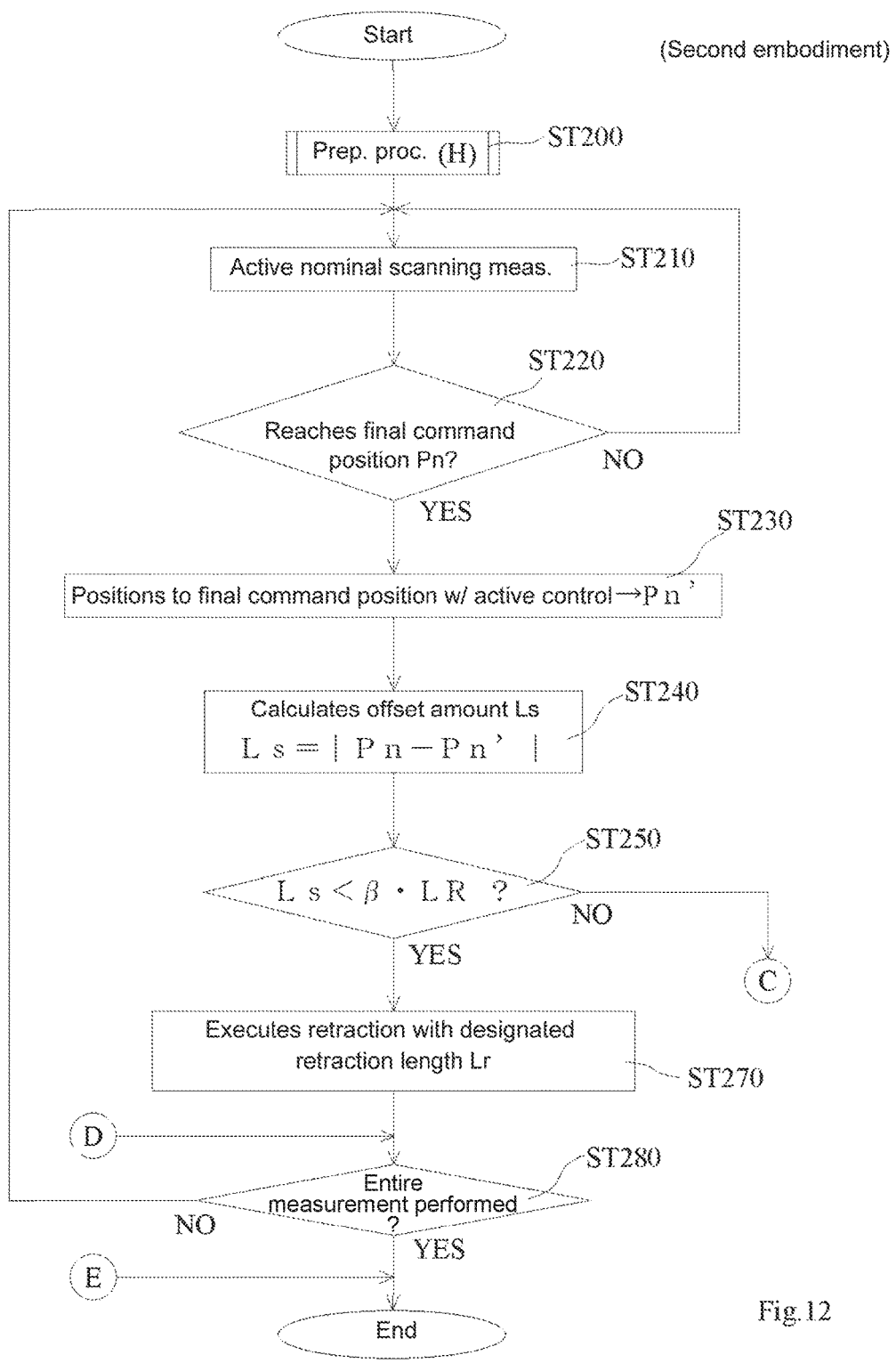
FIG. 12 is a flow chart describing operations of "nominal scanning measurement with error avoidance function" in a second embodiment.
Figure 13:
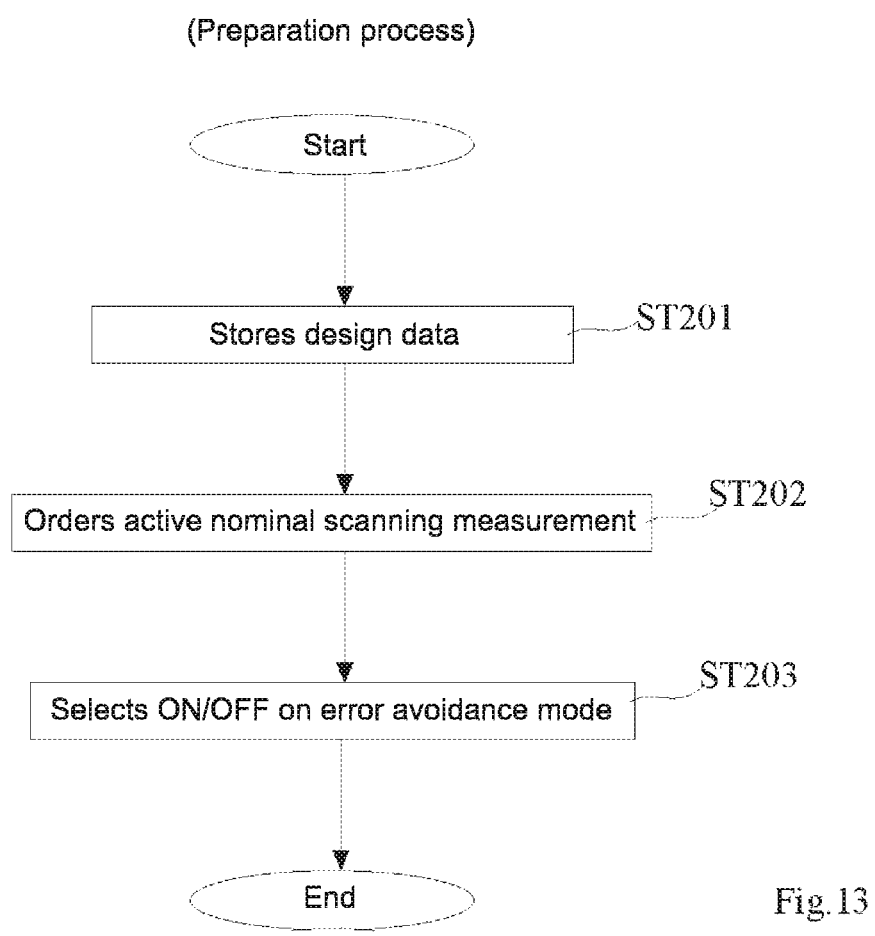
FIG. 13 is a flow chart illustrating a procedure of a preparation process (ST200)
Figure 14:
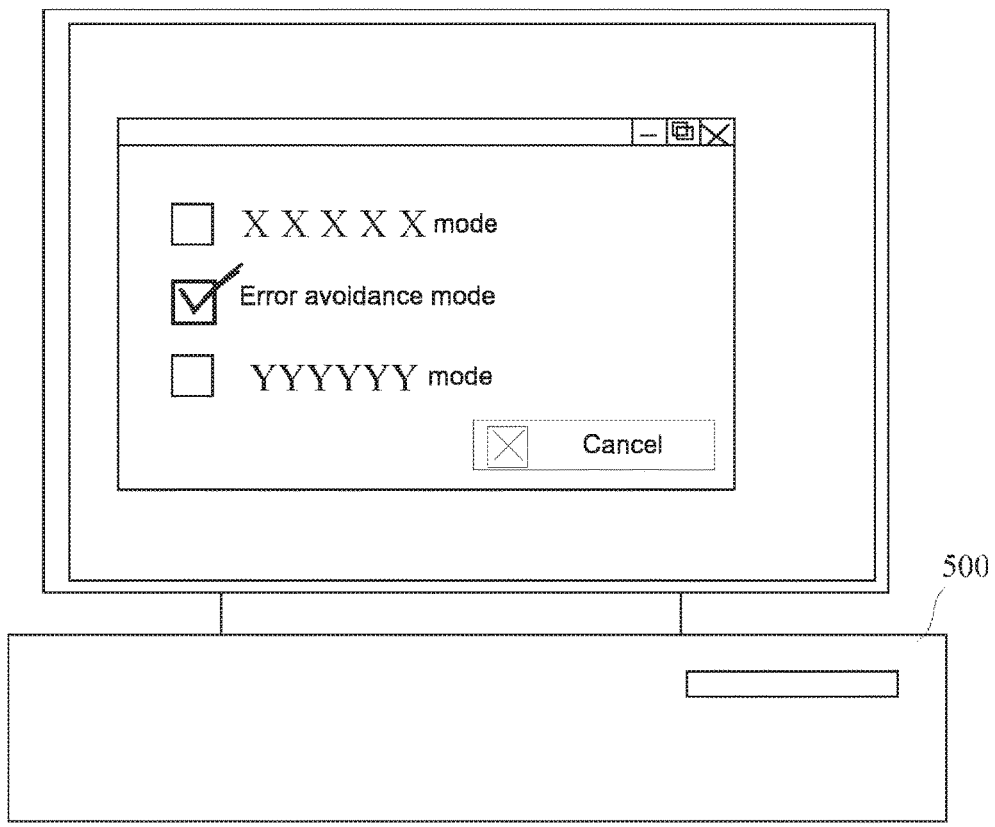
FIG. 14 illustrates an exemplary selection screen in which the user selects ON/OFF on an error avoidance mode.

FIG. 12 is a flow chart describing operations of "the nominal scanning measurement with the error avoidance function" (second embodiment). First, a necessary preparation for scanning measurement is performed (preparation process ST200). As shown in a flowchart of FIG. 13, the preparation process ST200 is basically the same as that of the first embodiment and therefore, detailed description of each step is omitted. In the second embodiment, an error avoidance mode is selected on a selection screen of FIG. 14 (ST203).

By undergoing the preparation process (ST200), the motion controller 300 measures the work piece with the active nominal scanning measurement (ST210). The active nominal scanning measurement is described in the first embodiment, and thus duplicative descriptions are omitted.

Figure 15:
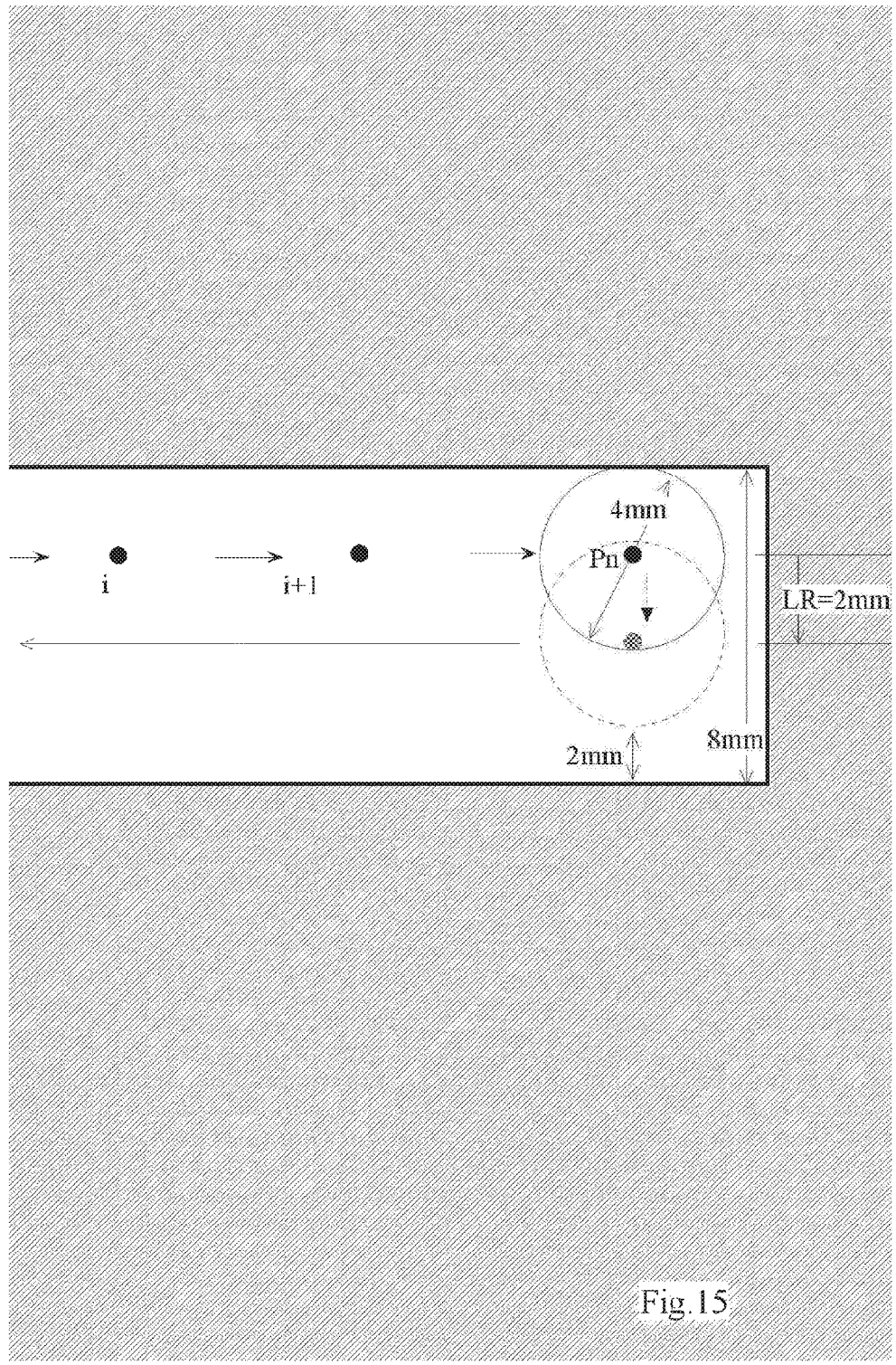
FIG. 15 illustrates how the fine hole processed as in the design data is measured with the active nominal scanning measurement.
Figure 16:
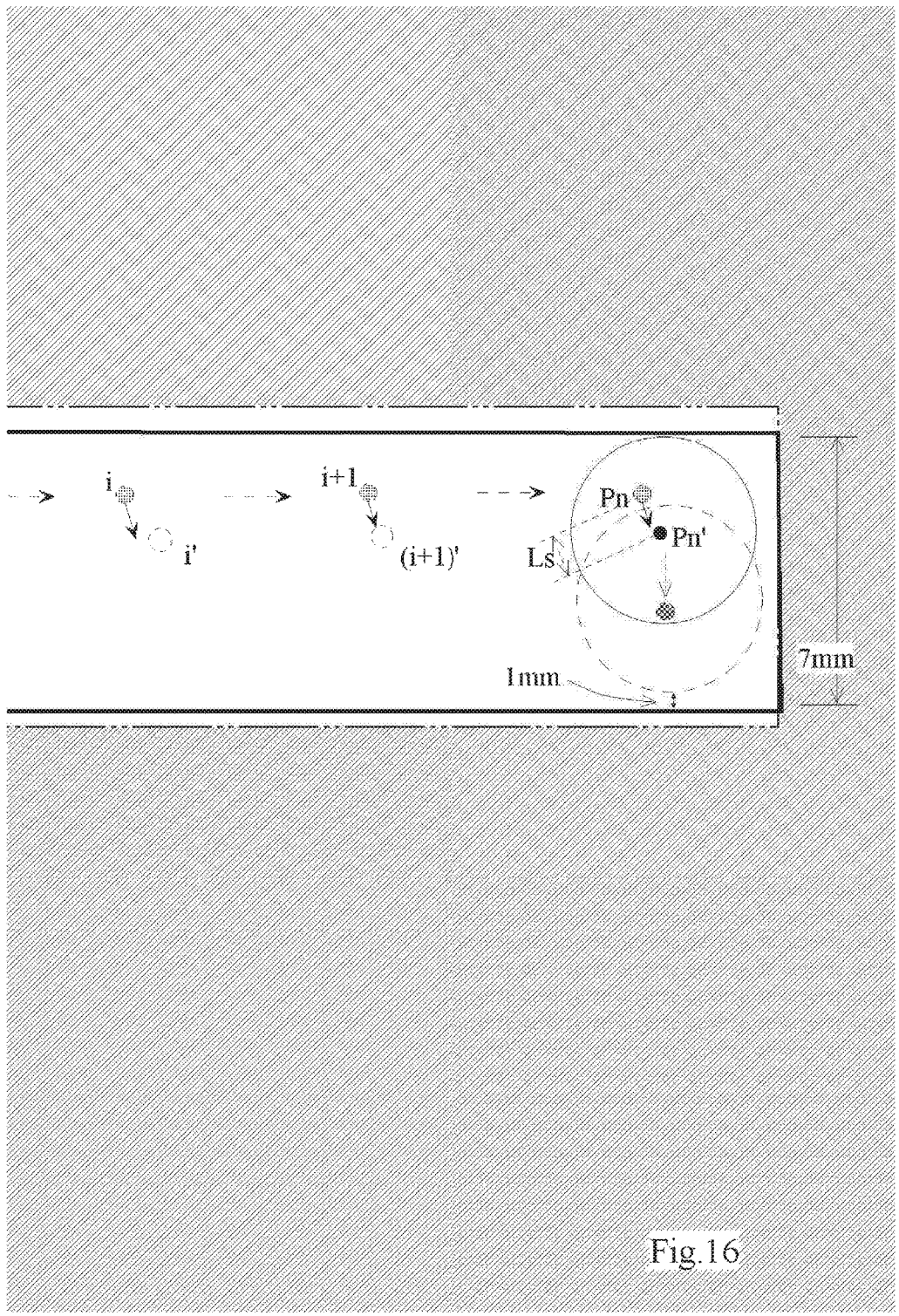
FIG. 16 illustrates how the work piece slightly shifted from the design data is measured with the active nominal scanning measurement.
Figure 17:
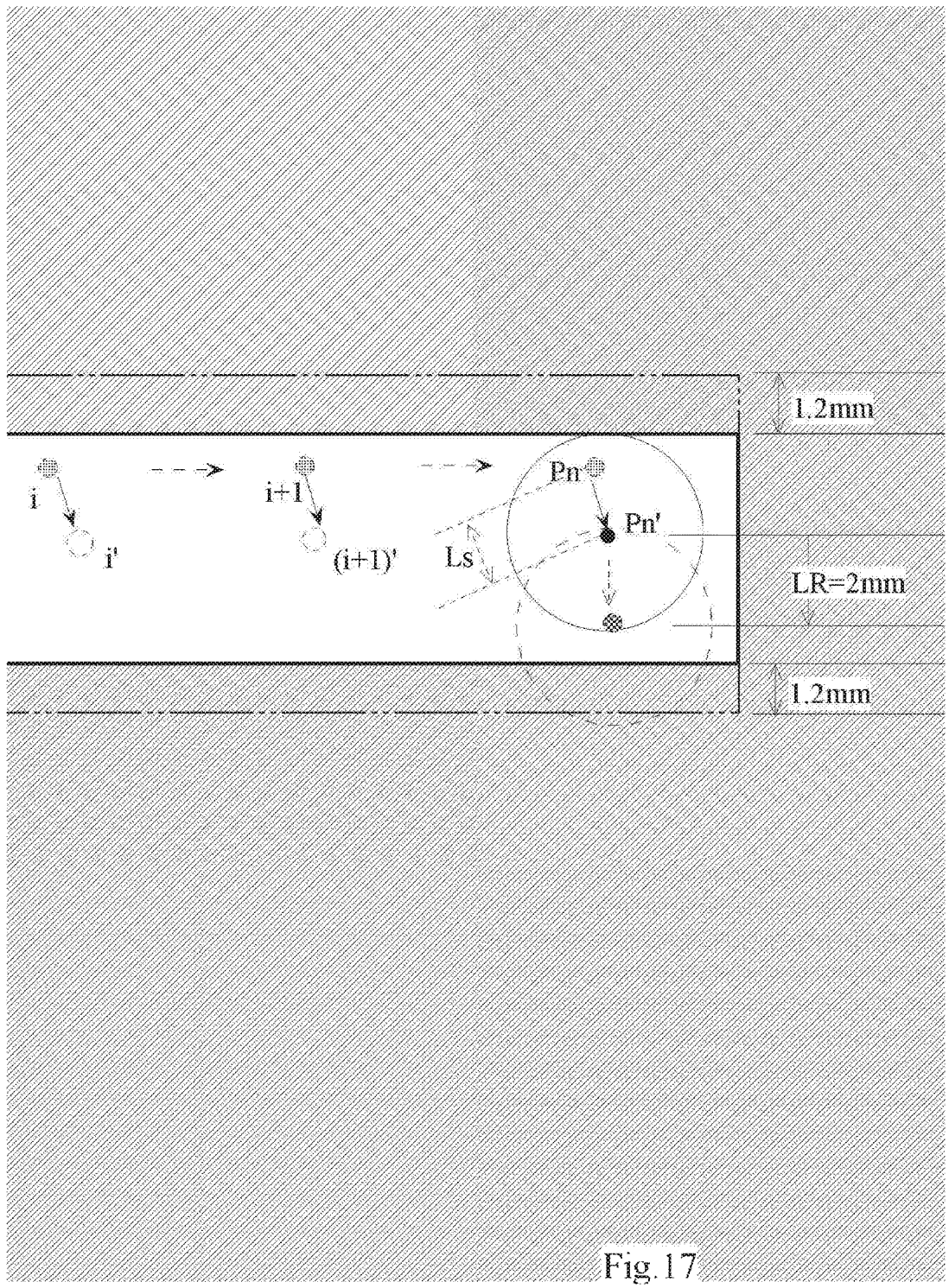
FIG. 17 illustrates how the work piece shifted from the design data is measured with the active nominal scanning measurement.

When describing the second embodiment, providing numerical values as examples helps understanding. FIGS. 15, 16, and 17 illustrate an exemplary case where the fine hole is measured with the active nominal scanning measurement. FIG. 15 illustrates a case where the fine hole processed as in the design data is measured with the active nominal scanning measurement. In this example, a width of the fine hole is 8 mm and a diameter of the stylus tip 232 is 4 mm. FIG. 16 illustrates a case where a work piece slightly shifted from the design data is measured with the active nominal scanning measurement. The hole in the design data is 8 mm, but in the actual work piece, side surfaces of the hole are shifted inward by about 0.5 mm, and thus the hole is about 7 mm. FIG. 17 is described below.

Further, the "hole" is illustrated as a typical example to facilitate understanding, however, there is no need for the "hole" to be a literal hole. A different portion of the work piece may of course be separated from a surface of a measured object by a slight gap.

Based on the design data, the route (PCC curve) of the nominal scanning measurement has the predetermined offset added to the design data. When the (active) nominal scanning measurement is performed, the coordinate measuring apparatus 200 is drive controlled such that the stylus tip 232 displaces from the interpolated point (i) to the next interpolated point (i+1) on the route (PCC curve). The point Pn in FIG. 15 (FIG. 16) is the final command position of the measurement of the fine hole portion. The motion controller 300 determines whether a displacement command reached the final command position Pn of the measured location (ST220). ("Whether a displacement command reached the final command position Pn of the measured location" means, in other words, whether the operation command reached the process immediately prior to the retraction operation.)

When the displacement command reaches the final command position Pn of the measured location (ST220: YES), the stylus tip 232 is positioned at the point on the surface of the work piece corresponding to the final command position Pn (without transitioning to the retraction command) (ST230). Since the active nominal scanning measurement is ON, the depression correction vector and the course correction vector are added to the displacement command (speed vector) displacing to the final command position Pn, and the probe 230 is automatically position-controlled to the point Pn' on the surface of the work piece corresponding to the final command position Pn (see FIG. 16). "Pn" represents the coordinate value "Pn'" for the center of the stylus tip.

The probe 230 is pressed by the predetermined amount of depression (0.3 mm) toward the surface of the work piece by active control, however, the coordinate value for the center of the stylus tip (Pn') is found based on the sum of the output of each encoder and the probe sensor output of the coordinate measuring apparatus 200, and has the same coordinate value while the stylus tip 232 is in contact with the work piece. (Since the probe sensor outputs the depression amount for how much the coordinate measuring apparatus 200 depresses the probe 230 toward the work piece, it comes out even.) In addition, since there is no offset between the design data and the actual work piece in FIG. 15, the final command position Pn should be interpreted to match the final position Pn'.

When the positioning to the final position Pn' is completed (ST230), an offset amount Ls between the final command position Pn and the final position Pn' is calculated (ST240) next.

$$Ls = |Pn - Pn'|$$

The offset amount Ls calculated in this way is compared to the designated retraction length LR (ST250). In this example, LR is multiplied by a predetermined coefficient β and a size of Ls is compared with a size of β·LR. As an example, β is 0.5.

In this example, the designated retraction length LR is a retraction length defined ahead of time. For example, the designated retraction length LR is defined as 2 mm based on the width of the hole being 8 mm and the diameter of the stylus tip 232 being 4 mm. With reference to FIG. 15, when the stylus tip 232 performs the retraction by the designated retraction length LR (2 mm) from a solid line (where the stylus tip is in contact with the side surface of the hole) to a dashed line, the center coordinate Pp of the stylus tip 232 comes to the center of the hole. In addition, the retraction direction Dr is obtained from the sensor output of the probe 230. In other words, the normal direction of the measurement surface at the point Psf is known based on the sensor output of the probe 230. The normal direction is defined as the retraction direction Dr. In FIG. 15, after the retraction is performed, there is a gap of about 2 mm between an outer surface of the stylus tip 232 and the side surface of the hole. (In this example, the stylus tip 232 is separated by 2 mm from the measured surface and from the opposing surface.) With the gap of about 2 mm, the probe 230 (stylus tip 232) is unlikely to come into contact (collide) with the work piece (hole) while displacing to the next location.

FIG. 15 presumes an ideal shape where no offset exists between the design data and the actual work piece, and therefore, Ls<β·LR is of course fulfilled (ST250: YES), and the designated retraction can be performed. Specifically, the retraction can be performed with the designated retraction length LR (=2 mm). Then, if there are locations to be measured next (ST280: NO), the active nominal scanning measurement is continued (ST210).

Next, see FIG. 16 as a reference. In FIG. 16, the actual work piece is shifted from the design data and the side surfaces of the hole are shifted inward by about 0.5 mm. Because of the active nominal scanning measurement, scanning measurement is possible even when the actual work piece is shifted from the design data. The probe is automatically position controlled to the point Pn' on the surface of the work piece corresponding to the final command position Pn after the depression correction vector and the course correction vector are added to the displacement command (speed vector) displacing to the final command position Pn (see FIG. 16).

When the positioning to the final position Pn' is completed (ST230), the offset amount Ls between the final command position Pn and the final position Pn' is calculated (ST240).

$$Ls=|Pn-Pn'|$$

In this example, Ls≈0.5 mm.

In FIG. 16, when Ls (≈0.5) and β·LR (=1.0 mm) are compared, Ls<β·LR is met (ST250: YES). Since a safety determination condition (Ls<β·LR) is met (ST250: YES), the retraction is performed as set (ST270). Specifically, the retraction can be performed with the designated retraction length LR (=2 mm).

The actual retraction is performed with the designated retraction length LR (=2 mm) as shown in FIG. 16. The gap of about 1 mm is preserved between the opposing surfaces of the hole and the stylus tip 232 as depicted in FIG. 16. With the gap of about 1 mm, the retraction can be performed safely.

In this example, the worst case is assumed where even though the offset amount Ls is 0.5 mm, the width of the hole narrows by 1.0 mm. Generally, since the direction of the offset (Ls) is not necessarily perpendicular to the surface, the width of the hole narrowing by 2×Ls can be considered the worst case. As shown in FIG. 16, even in a case where the actual work piece is shifted from the design data, the retraction can be performed safely with the designated retraction length LR if the offset amount Ls is sufficiently smaller than the designated retraction length LR.

FIG. 17 is described in the following. In FIG. 17, the actual work piece is shifted from the design data and the side surfaces of the hole are shifted inward by about 1.2 mm each. Because of the active nominal scanning measurement, scanning measurement is possible even when the actual work piece is shifted from the design data. For example, a tolerance value of a course error ΔL up to about 1.5 mm is acceptable. With the processing error of about 1.2 mm previously mentioned, the scanning measurement is possible with the course correction using the active nominal scanning measurement.

In FIG. 17, positioning to the final position Pn' corresponding to the final command position Pn is completed (ST230). The offset amount Ls between the final command position Pn and the final position Pn' is calculated (ST240).

$$Ls=|Pn-Pn'|$$

In this example, Ls≈1.2 mm.

In FIG. 17, when Ls (≈1.2) and β·LR (=1.0 mm) are compared, Ls<β·LR is not met (ST250: NO). In other words, the safety determination condition (Ls<β·LR) is not met. In this case, when the retraction is performed with the retraction length LR as set, the stylus tip 232 may collide with the opposing surface.

In FIG. 17, when the side surfaces of the hole are shifted inward by about 1.2 mm each, the width of the hole may be about 5.6 mm. When the retraction is performed with the designated retraction length LR (=2 mm), the retraction length LR (=2 mm) is added to the diameter of the stylus tip 232 (=4 mm), reaching 6 mm. The error signal is not output until the amount of depression reaches 0.3 mm. Even when estimating a depression margin of 0.3 mm on the gap of 5.6 mm, the stylus tip is pressed toward the opposing surface in excess of a standard amount of depression (0.3 mm), as expected. When the displacement speed during the retraction is fast, the stylus tip may exceed the standard amount of depression (0.3 mm) and collide with the opposing surface.

Figure 18:
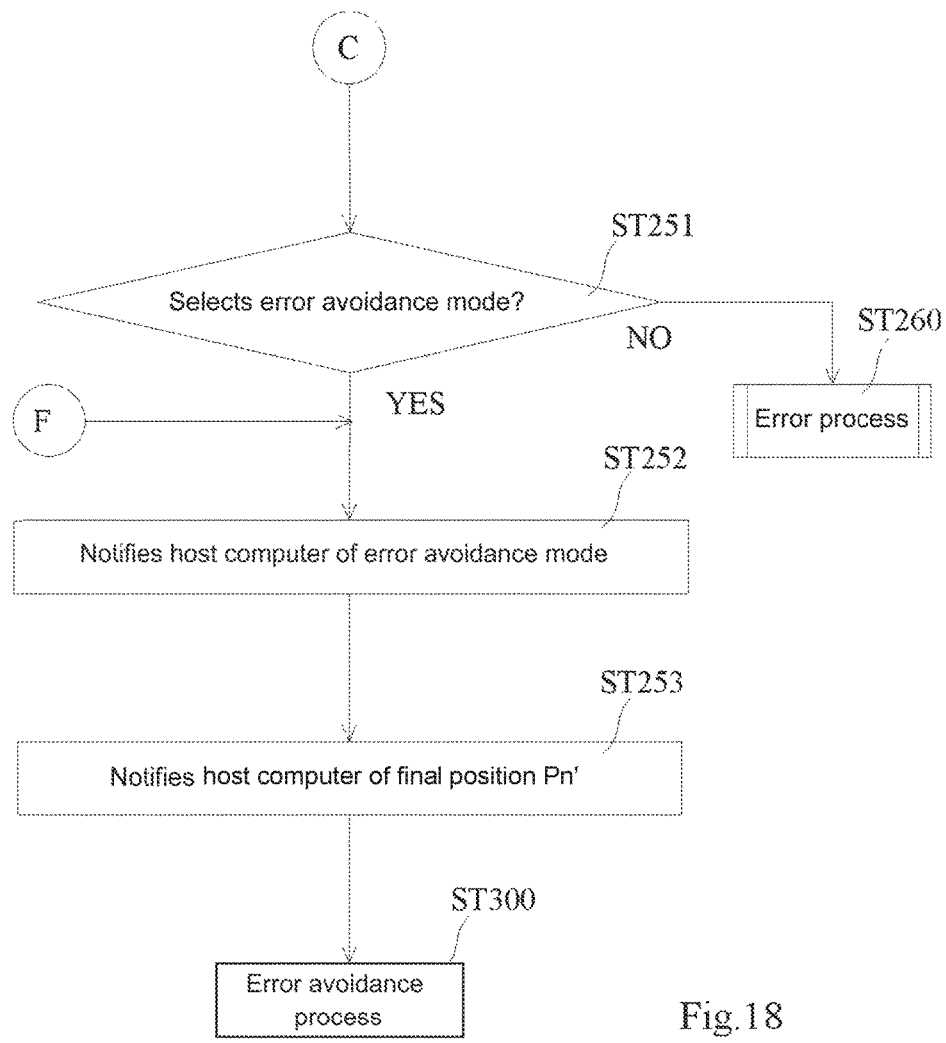
FIG. 18 is a flow chart illustrating a procedure of preliminary preparation of an error avoidance process.

In a case where the safety determination condition (Ls<β·LR) is not met (ST250: NO), the retraction is performed by switching to the error avoidance process (ST300, FIG. 18).

When the safety determination condition (Ls<β·LR) is not met (ST250: NO), confirmation is performed to check if the error avoidance mode is selected (ST251). When the error avoidance mode is selected (ST251: YES), the process transitions to the error avoidance process (ST300). However, before transitioning to the error avoidance process (ST300), the motion controller 300 notifies the host computer 500 about the transition to the error avoidance process (ST252). The host computer 500 notifies the user about the transition to the error avoidance process (for example, displaying on the display), and in addition, sets measurement operations such as storing the measurement data in a standby state temporarily.

Next, the motion controller 300 obtains the coordinates of the final position Pn' and notifies the host computer 500 (ST253). The final position Pn' refers to the point where the retraction cannot be performed with the designated retraction length LR. The host computer 500 stores the coordinate value of the final position Pn' and resets the correction of the design data and the designated retraction length LR so as to measure the subsequent work pieces without errors using the nominal scanning measurement.

Figure 19:
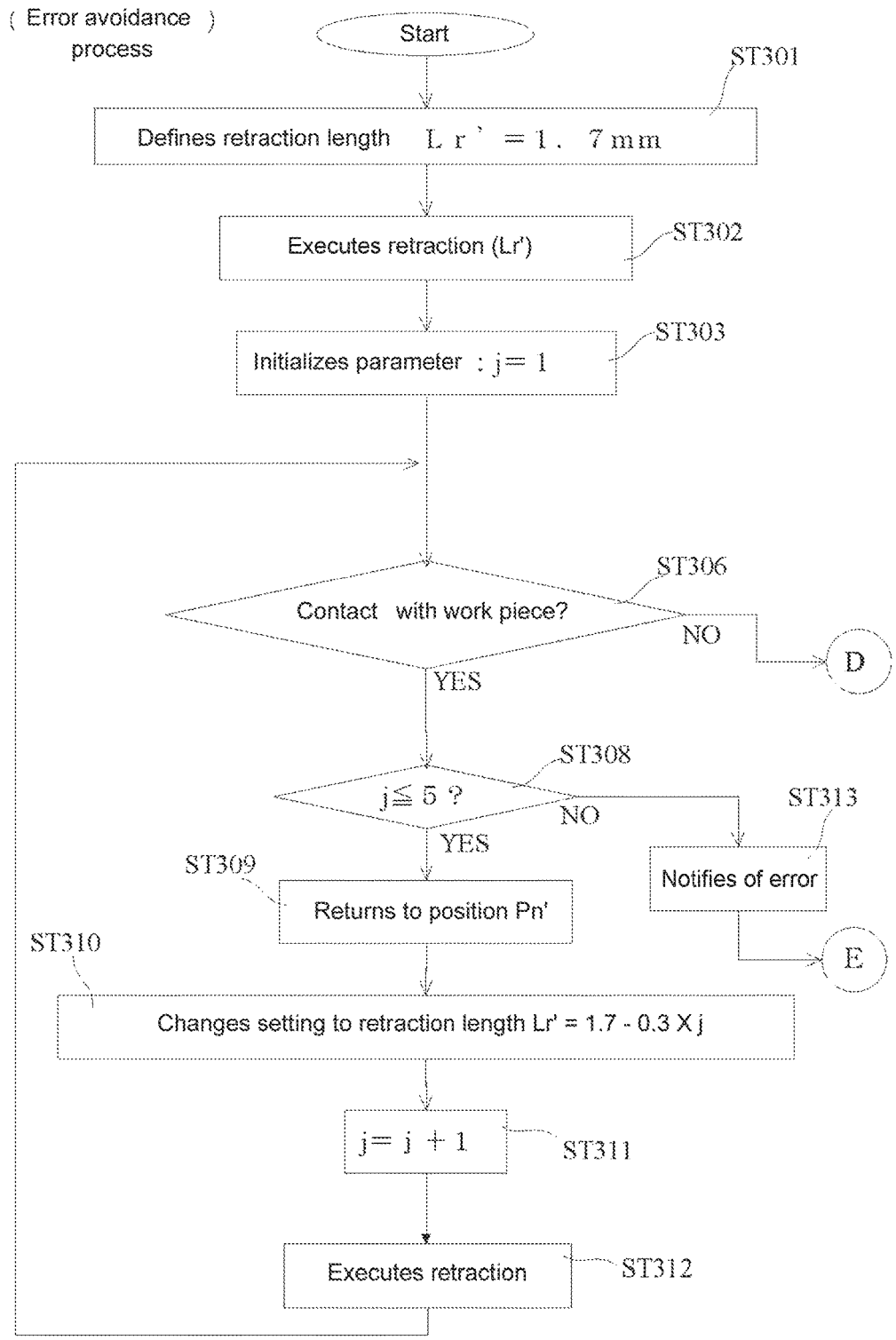
FIG. 19 is a flow chart describing a specific procedure of the error avoidance process (ST300)

Thereafter, the error avoidance process (ST300) is performed. FIG. 19 is a flow chart describing a specific procedure of the error avoidance process (ST300). First, the retraction length is changed to a setting of a preset short length for the error avoidance process (ST301). In this example, an error avoidance retraction length Lr' is preset to 1.7 mm. This length is shorter than the designated retraction length LR by 0.3 mm.

Further, the error avoidance retraction length Lr' is not limited to 1.7 mm and may be set as appropriate between 0.1 mm through 1.9 mm.

The retraction is executed with the error avoidance retraction length Lr' (=1.7 mm) (ST302). (The direction of the retraction is the normal direction of the measured surface obtained from the sensor output of the probe 300.) In addition, a number of retractions using the error avoidance retraction length is stored for a subsequent process. In this example, since this is the first trial, a parameter j is initialized at 1 (ST303).

Figure 20:
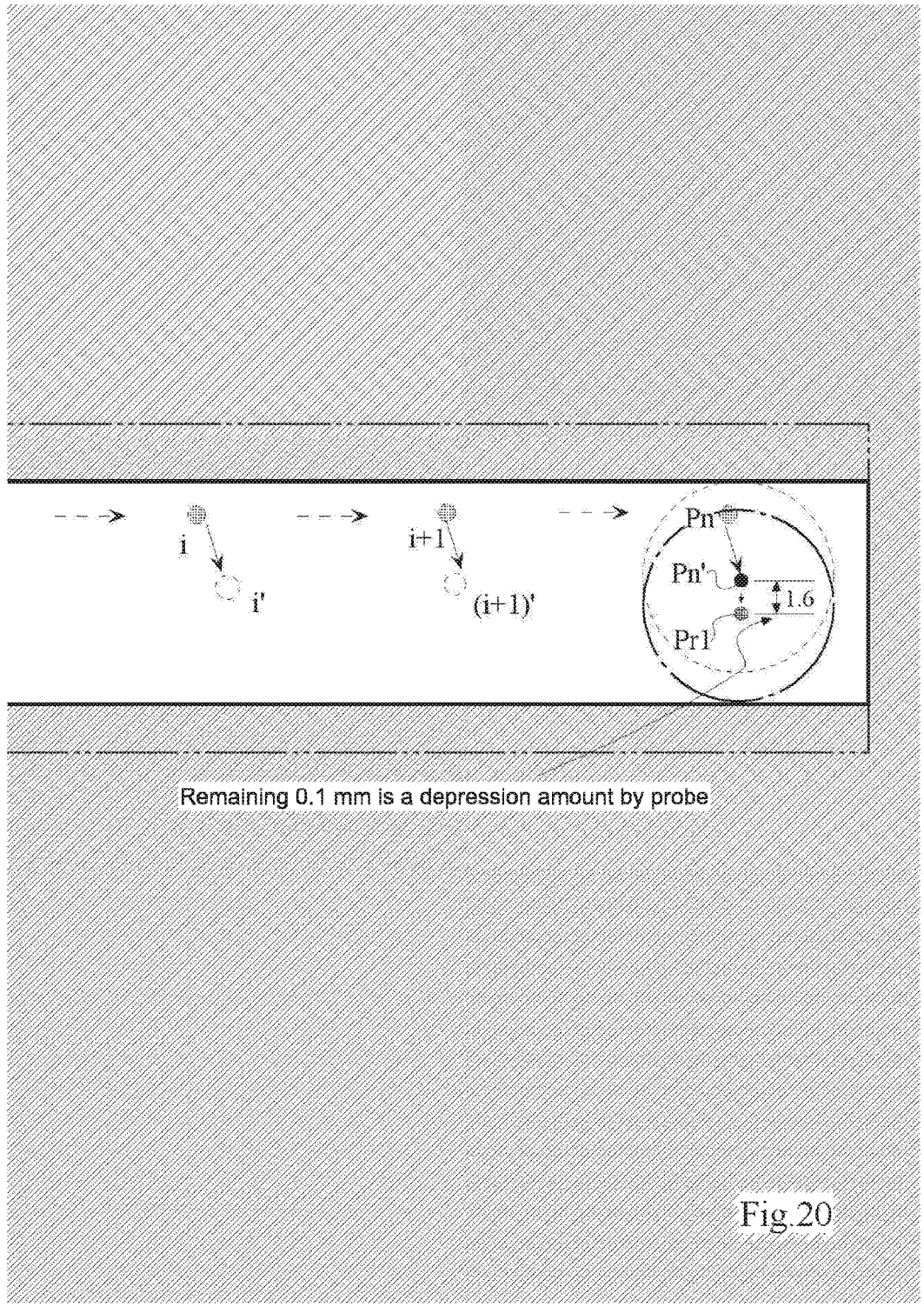
FIG. 20 illustrates a state where a retraction is performed at Lr'=1.7 mm.

FIG. 20 illustrates a state where the retraction is performed by Lr'=1.7 mm.

Currently, a situation is considered where both side surfaces of the hole are shifted inward by 1.2 mm, and therefore the width of the hole is only 5.6 mm. When the retraction of the stylus tip with 4 mm diameter is performed by 1.7 mm, the stylus tip comes into contact with the opposing surface at the point when the retraction is performed by 1.6 mm, and further, the probe is pressed toward the opposing surface by 0.1 mm. In addition, if the retraction is performed at 2.0 mm, which is the designated retraction length LR, the probe is pressed toward the opposing surface by 0.4 mm. Specifically, when using the designated retraction length LR (=2.0 mm), there is a possibility of the probe pressing toward the opposing surface by exceeding the standard amount of depression (0.3 mm). In this regard, changing the setting to the error avoidance short retraction length Lr' (=1.7 mm) has a point.

However, even if the error avoidance short retraction length Lr' is used, there is no guarantee of success in the retraction. Although the possibility of a collision with the opposing surface by an excessive amount of depression may be reduced, the stylus tip may be in contact with the opposing surface as seen in this case.

When the contact between the stylus tip 232 and the work piece is detected (ST306: YES), the motion controller 300 confirms the value of the parameter j (ST308). When the parameter j is 5 or less (ST308: YES), the stored coordinate value Pn' is read and the stylus tip 232 is returned to the coordinate value Pn'.

When returned to the coordinate value Pn', the retraction length Lr' is reset (ST310). In other words, the retraction length Lr' is set to be further shortened by 0.3 mm (ST310). After "1" is added to the parameter j (ST311), the retraction is performed using the reset retraction length Lr'(=1.4) (ST312).

Figure 21:
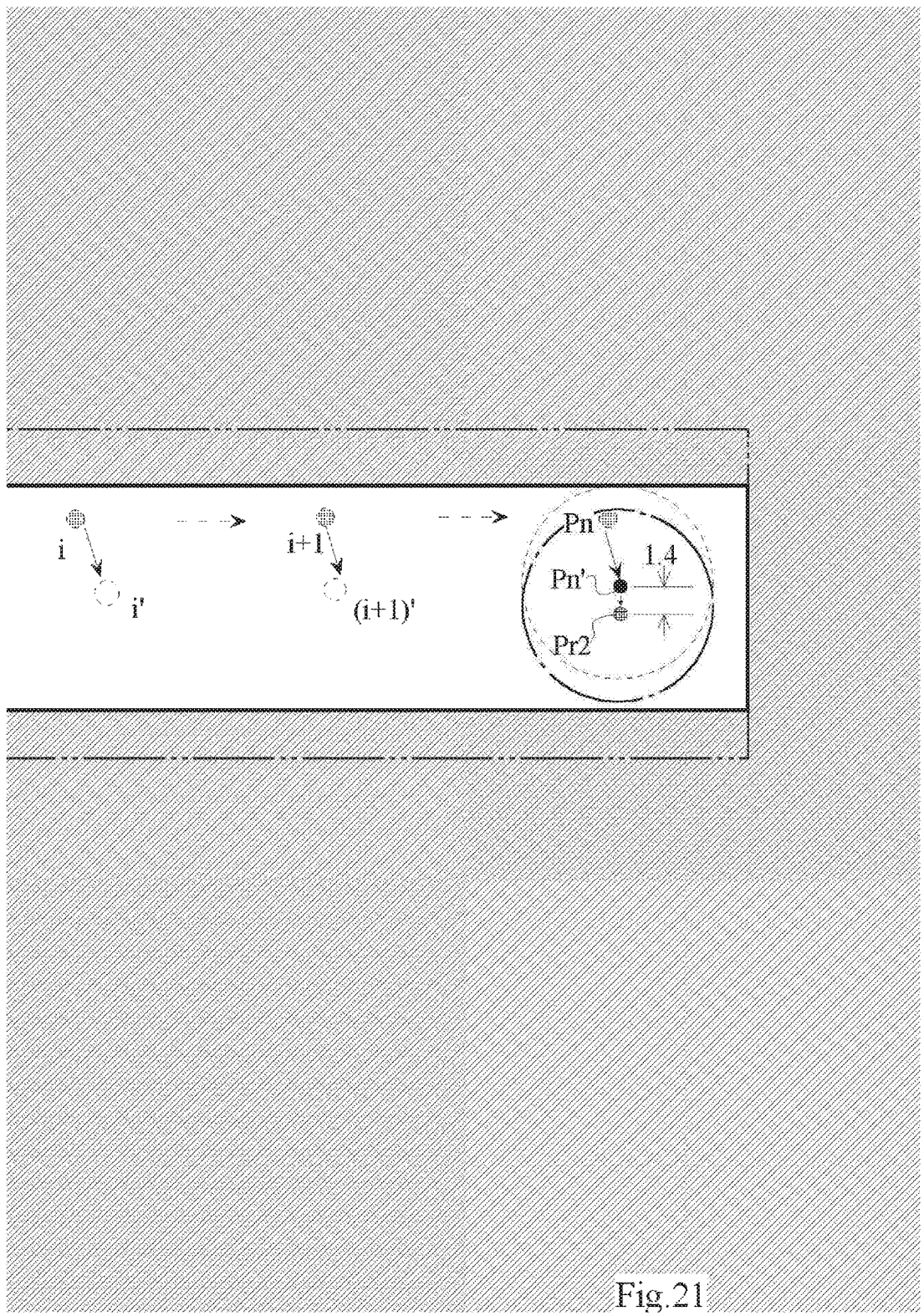
FIG. 21 illustrates an exemplary state where the retraction is performed by 1.4 mm from coordinate value Pn'.

FIG. 21 illustrates an exemplary state where the retraction is performed by 1.4 mm from the coordinate value Pn'. This time, the retraction is successful without contacting the opposing surface (ST306: NO). Therefore, the process returns to ST280 (FIG. 12) and the main flow (ST210-ST280) can be continued thereafter until all the measurements are completed. Specifically, when the next measurement location exists, the stylus tip can be displaced to the next destination from a post-retraction position (Pr2).

In this way, when the work piece is shifted from the design data and the safety determination condition (Ls<β·LR) is not met (ST250: NO), the setting can be changed to the error avoidance retraction length Lr', and furthermore, the retraction length Lr' can be gradually shortened, and thus safe retraction can successfully be performed.

In addition, in a case where the contact with the work piece is not resolved (ST306: YES) even after the retraction is performed repeatedly while shortening the retraction length Lr', when the parameter j reaches 5 in this example (ST308: NO), the process exits from a loop of the error avoidance process (FIG. 19). The retraction length Lr' can no longer be shorter and unexpected reasons are considered for the error. Accordingly, when the parameter j reaches 5 (ST308: NO), the motion controller 300 notifies the host computer 500 of the error (ST313) and then ends the process.

An additional statement is provided regarding a scenario in which the user does not select the error avoidance mode in the selection of the error avoidance mode (ST203) during the preparation process (ST200). In the state where the error avoidance mode is not selected, the offset amount Ls may be equal to or higher than β·LR (ST250: NO). In such a case, the process may be ended with an error or the user may be given another chance to re-select.

Figure 22:
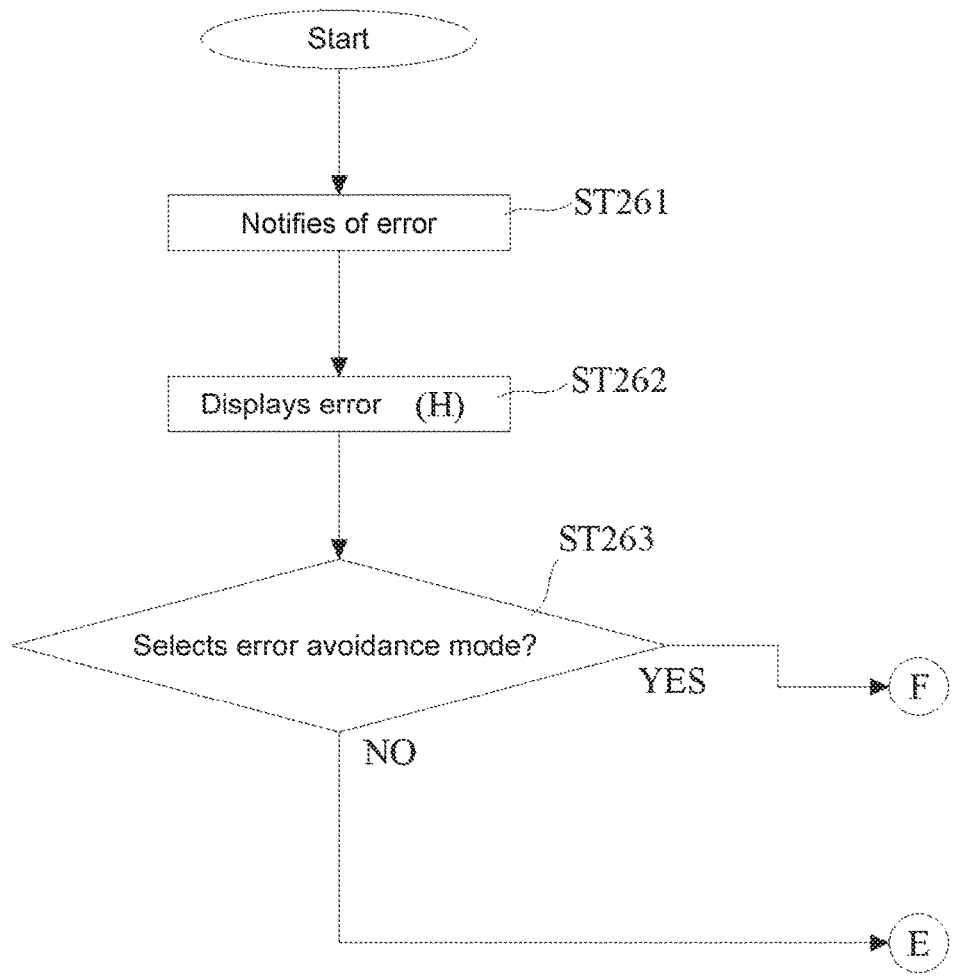
FIG. 22 is a flow chart illustrating a procedure of an error process (ST260)

When the probe 230 (stylus tip 232) reaches the final command position Pn, the offset amount Ls is equal to or higher than β·LR (ST250: NO), however, the selection of the error avoidance mode is not selected (ST251: NO). In this case, the following error process is executed (ST260). FIG. 22 illustrates a procedure of the error process (ST260). The motion controller 300 notifies the host computer 500 of the error (ST261). Specifically, the motion controller 300 notifies the host computer 500 of the offset amount Ls being somewhat larger compared to the designated retraction length LR in the state where the error avoidance mode is not selected (ST250: NO). When the error notification is received, the host computer 500 displays the error message (for example, displayed on the display). At the same time, the host computer 500 displays the selection screen shown in FIG. 14 on the display and the user selects ON/OFF on the error avoidance mode.

When the user selects ON on the error avoidance mode (ST263: YES), the process transitions to the error avoidance process (ST300) (F in FIG. 18). In this case, the error avoidance process (FIG. 19) described above is executed.

When the user does not select the error avoidance mode (for example, cancels or the like without selecting the error avoidance mode), the process ends at that point. (Thereafter, manual operation is performed at the user's discretion.)

The following beneficial effects are achieved with the second embodiment. In the second embodiment, the offset amount Ls between the final command position Pn and the final position point Pn' corresponding to the final command position Pn is obtained. When the offset amount Ls is large, the offset between the design data and the work piece is also large. Therefore, when the retraction is performed with the designated retraction length LR, there is a risk of colliding with the opposing surface unexpectedly. In this regard, in the second embodiment, the offset amount Ls and the designated retraction length LR are compared to determine whether the designated retraction length LR is (sufficiently) larger than the offset amount Ls, that is, determining whether the retraction can be performed safely. When a determination is reached that the retraction cannot be performed safely with the designated retraction length LR, the retraction is executed using the error avoidance retraction length Lr', which is set shorter. Therefore, a situation such as colliding with the opposing surface when the retraction is performed with the designated retraction length LR can be avoided as much as possible. Accordingly, a reduction of a burden to the probe can be expected. When the active control scanning measurement is performed on the work piece with the slightly large offset from the design data, the measurement continues without suspending the measurement due to an error during the retraction, thus leading to the improvement of measurement efficiency.

Second Modification Example

Figure 23:
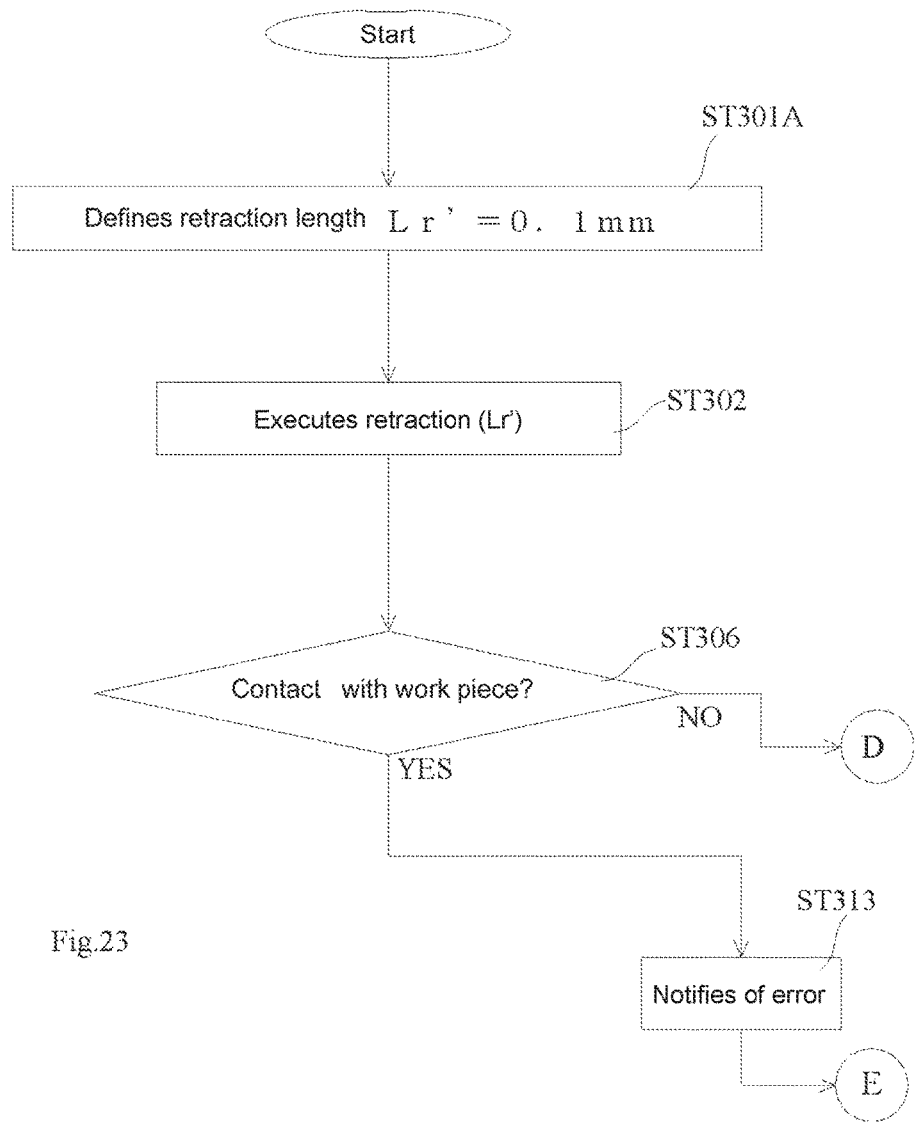
FIG. 23 is a flow chart illustrating a modification 2.

In the second embodiment mentioned above, in a case where the safety determination condition (Ls<β·LR) is not met (ST250: NO), the retraction length Lr' is gradually shortened. In this regard, in a second modification example, as shown in a flow chart in FIG. 23, the error avoidance retraction length Lr' may be set at an extremely short value such as 0.1 mm, for example (ST301A). If such an extremely short retraction length Lr' (=0.1 mm) is used, a situation such that the probe comes in contact with the opposing surface during the retraction can reliably be avoided.

In this connection, given the above noted case, the designated retraction length LR can be set to be the extremely short value (=0.1 mm) from the beginning, however, that is not preferable. If the retraction length LR has the extremely short value, the possibility of the probe coming into contact with the opposing surface becomes extremely low. However, there is a small possibility that another problem may arise with a designated retraction length LR which is too short.

Figure 24:
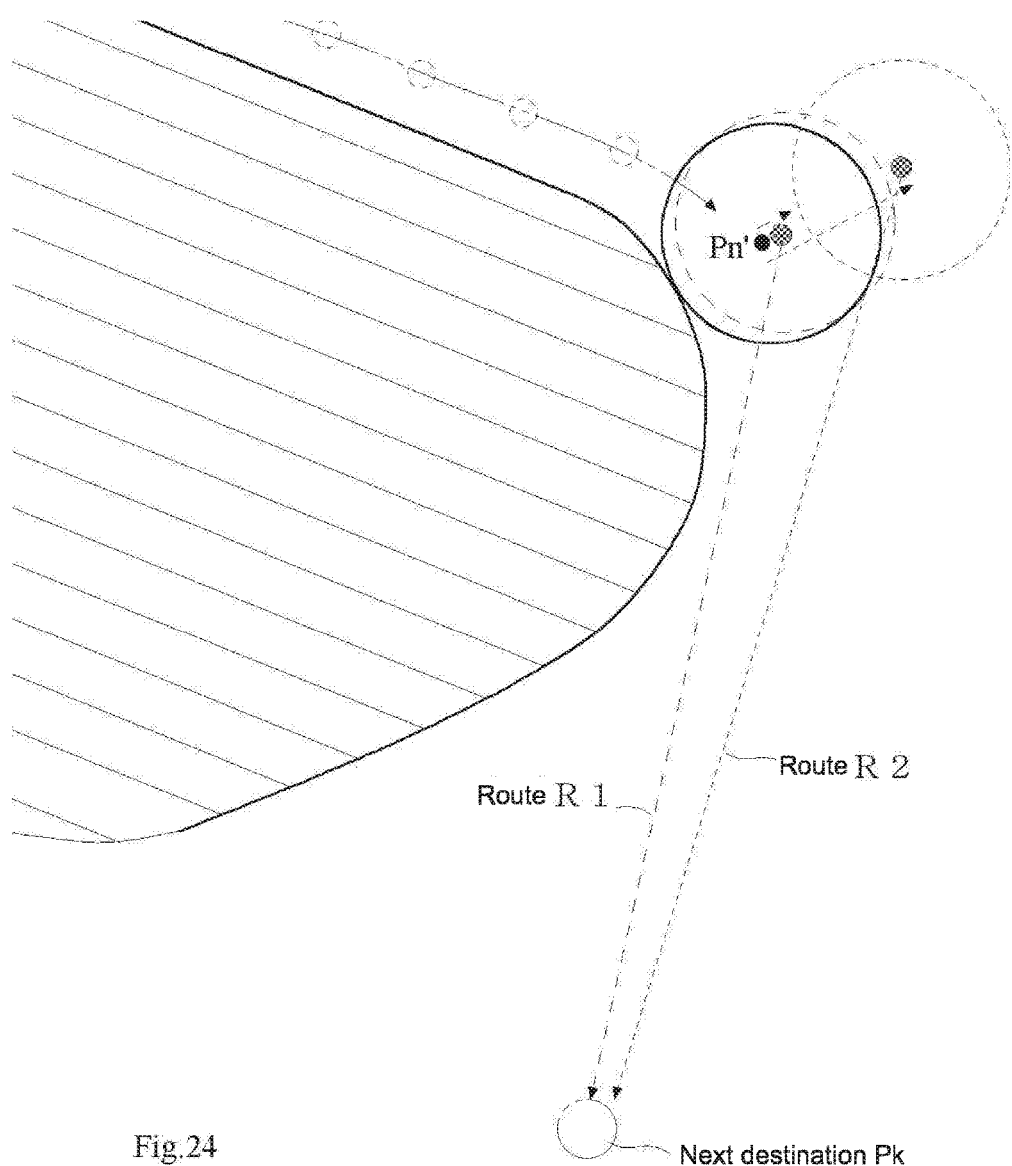
FIG. 24 illustrates an exemplary concern when a retraction length is too short.

As shown in FIG. 24, for example, the scanning measurement is performed on the outer surface of a curved work piece and reaches the first end point Pn'. In addition, the next destination is positioned at a point Pk, for example. If there is not sufficient separation distance between the probe and the work piece because the retraction length LR is too short, there is a risk that the probe and the work piece may come in contact when moving to the next destination Pk (see a route R1 in FIG. 24). In contrast, if there is sufficient separation distance between the probe and the work piece, the possibility of the probe coming into contact with the work piece is low when moving to the next destination Pk (see a route R2 in FIG. 24). Therefore, the designated retraction length LR needs to be set to have a sufficient separation distance to secure safety. Making a change to the setting in the short retraction length Lr' is appropriate to reserve for special cases of error avoidance such as when the safety determination condition (Ls<β·LR) is not met (ST250: NO). Further, the error avoidance retraction length Lr' is not limited to 0.1 mm and a suitable value may be selected from a range between 0.1 to 0.5 mm but more preferably 0.1 mm to 0.3 mm, for example.

Moreover, the present invention is not limited to the embodiments described above, and may be modified as needed without departing from the scope of the present invention. In the embodiments noted above, the active nominal scanning measurement is mainly described, however, the "active nominal scanning measurement" may be replaced with a "point measurement." In other words, the present invention can be applied to point measurement. Point measurement (referred to as a touch measurement as well) is well known. In point measurement, the probe 230 is temporarily separated from the work piece. Point measurement is a measurement method where the probe 230 (stylus tip 232) approaches the work piece and a coordinate value is obtained when an amount of depression reaches a predetermined value (for example, 0.3 mm). Since the retraction is necessary when moving from one measurement point (point) to the next measurement point (point), the present invention is effective.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A control method of a shape measuring apparatus including a probe having a stylus tip at a forefront end and a displacement mechanism displacing the probe, detecting contact between the stylus tip and a surface of a work piece, and measuring a shape of the work piece, the method comprising:
   when executing a retraction separating the stylus tip from the work piece from a state in which the stylus tip and the work piece are in contact:
      obtaining an offset amount Ls between a final command position Pn and a final positioning point Pn' corresponding to the final command position Pn;
      comparing the offset amount Ls to a designated retraction length LR designated in advance,
      executing the retraction with the designated retraction length LR when Ls<β·LR is met,
      executing the retraction with an error avoidance retraction length Lr' which is defined at a value shorter than the designated retraction length LR when Ls<β·LR is not met, and
      β is 0<β<1.

2. The control method of the shape measuring apparatus according to claim 1, further comprising returning the probe to the final positioning point Pn' when the contact is detected between the probe and the work piece after the retraction is executed with the error avoidance retraction length Lr'.

3. The control method of the shape measuring apparatus according to claim 2, further comprising:
   returning the probe to the final positioning point Pn'; and
   executing the retraction with a retraction length Lr' which is shorter than the error avoidance retraction length Lr'.

4. The control method of the shape measuring apparatus according to claim 1, wherein a direction of the retraction when executing the retraction with the error avoidance retraction length Lr' is a normal direction of a measured surface obtained based on a sensor output of the probe.

5. The control method of the shape measuring apparatus according to claim 1, wherein the error avoidance retraction length Lr' is a value selected from a range between 0.1 mm and 0.5 mm.

6. A control method of a shape measuring apparatus including a probe having a stylus tip at a forefront end and a displacement mechanism displacing the probe, detecting contact between the stylus tip and a surface of a work piece, and measuring a shape of the work piece, the method comprising:
   when executing a retraction separating the stylus tip from the work piece from the state where the stylus tip and the work piece are in contact:
      monitoring whether there is contact between the stylus tip and the work piece, and
      displacing the probe to a position where the stylus tip does not contact the work piece when the contact between the stylus tip and the work piece is detected during the retraction.

7. The control method of the shape measuring apparatus according to claim 6, further comprising sampling coordinates of a contact point Pco between the stylus tip and the work piece when the contact between the stylus tip and the work piece is detected during the retraction.

8. The control method of the shape measuring apparatus according to claim 7, further comprising:
   obtaining a distance Lm between a point Psf on the work piece surface at a retraction start point and the contact point Pco between the stylus tip and the work piece;
   defining a proper retraction amount Lr based on the distance Lm and a diameter of the stylus tip; and
   displacing the stylus tip to a retraction stop point Pr, wherein the retraction stop point Pr is a point displaced by the proper retraction amount Lr in a direction of the retraction from the retraction start point.

9. The control method of the shape measuring apparatus according to claim 8, wherein the proper retraction amount Lr is defined as Lr=(Lm−d)×k, where d is the diameter of the stylus tip and using a prescribed coefficient k which is a positive integer smaller than 1 (0<k<1).

10. A non-transitory computer-readable storage medium that stores a program for executing a control method of a shape measuring apparatus having a probe having a stylus tip at a forefront end and a displacement mechanism displacing the probe, detecting contact between the stylus tip and a surface of a work piece, and measuring a shape of the work piece, the program causing the computer to execute a process comprising:

when executing a retraction separating the stylus tip from the work piece from a state in which the stylus tip and the work piece are in contact:
obtaining an offset amount Ls between a final command position Pn and a final positioning point Pn' corresponding to the final command position Pn;
comparing the offset amount Ls to a designated retraction length LR designated in advance,
executing the retraction with the designated retraction length LR when Ls<β·LR is met,
executing the retraction with an error avoidance retraction length Lr' which is defined at a value shorter than the designated retraction length LR when Ls<β·LR is not met, and
β is 0<β<1.

11. The non-transitory computer-readable storage medium according to claim 10, the process further comprising returning the probe to the final positioning point Pn' when the contact is detected between the probe and the work piece after the retraction is executed with the error avoidance retraction length Lr'.

12. The non-transitory computer-readable storage medium according to claim 11, the process further comprising:
returning the probe to the final positioning point Pn'; and
executing the retraction with a retraction length Lr'' which is shorter than the error avoidance retraction length Lr'.

13. The non-transitory computer-readable storage medium according to claim 10, wherein a direction of the retraction when executing the retraction with the error avoidance retraction length Lr' is a normal direction of a measured surface obtained based on a sensor output of the probe.

14. The non-transitory computer-readable storage medium according to claim 10, wherein the error avoidance retraction length Lr' is a value selected from a range between 0.1 mm and 0.5 mm.

15. A non-transitory computer-readable storage medium that stores a program for executing a control method of a shape measuring apparatus including a probe having a stylus tip at a forefront end and a displacement mechanism displacing the probe, detecting contact between the stylus tip and a surface of a work piece, and measuring a shape of the work piece, the program causing the computer to execute a process comprising:

wherein, when executing a retraction separating the stylus tip from the work piece from the state where the stylus tip and the work piece are in contact:
monitoring whether there is contact between the stylus tip and the work piece, and
displacing the probe to a position where the stylus tip does not contact the work piece when the contact between the stylus tip and the work piece is detected during the retraction.

16. The non-transitory computer-readable storage medium according to claim 15, the process further comprising sampling coordinates of a contact point Pco between the stylus tip and the work piece when the contact between the stylus tip and the work piece is detected during the retraction.

17. The non-transitory computer-readable storage medium according to claim 16, the process further comprising:
obtaining a distance Lm between a point Psf on the work piece surface at a retraction start point and the contact point Pco between the stylus tip and the work piece;
defining a proper retraction amount Lr based on the distance Lm and a diameter of the stylus tip; and
displacing the stylus tip to a retraction stop point Pr, wherein the retraction stop point Pr is a point displaced by the proper retraction amount Lr in a direction of the retraction from the retraction start point.

18. The non-transitory computer-readable storage medium according to claim 17, wherein the proper retraction amount Lr is defined as Lr=(Lm−d)×k, where d is the diameter of the stylus tip and using a prescribed coefficient k which is a positive integer smaller than 1 (0<k<1).

* * * * *